(12) United States Patent
Nakashio et al.

(10) Patent No.: US 7,092,225 B2
(45) Date of Patent: Aug. 15, 2006

(54) MAGNETIC TUNNEL EFFECT TYPE MAGNETIC HEAD, AND METHOD OF PRODUCING SAME

(75) Inventors: Eiji Nakashio, Miyagi (JP); Seiji Onoe, Miyagi (JP); Junichi Sugawara, Miyagi (JP); Toru Katakura, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/091,084

(22) Filed: Mar. 28, 2005

(65) Prior Publication Data

US 2005/0168884 A1 Aug. 4, 2005

Related U.S. Application Data

(63) Continuation of application No. 09/898,259, filed on Jul. 3, 2001, now Pat. No. 6,873,502.

(30) Foreign Application Priority Data

Jul. 6, 2000 (JP) .......................... P2000-205927

(51) Int. Cl.
G11B 5/127 (2006.01)
G11B 5/33 (2006.01)
(52) U.S. Cl. ................ 360/324.2; 29/603.12; 29/603.13
(58) Field of Classification Search ............ None
See application file for complete search history.

(56) References Cited

U.S. PATENT DOCUMENTS 5,390,061 A * 2/1995 Nakatani et al. ......... 360/324.2
5,759,681 A * 6/1998 Hosoe et al. .............. 428/332
5,898,549 A * 4/1999 Gill ....................... 360/324.11
5,999,379 A * 12/1999 Hsiao et al. .............. 360/320
6,256,178 B1 * 7/2001 Gill ......................... 360/324.2
6,369,984 B1 * 4/2002 Sato ........................ 360/126
6,392,281 B1 * 5/2002 Tsuge ..................... 257/421
6,452,761 B1 * 9/2002 Carey et al. .............. 360/320
6,456,461 B1 * 9/2002 Sato ........................ 360/126
6,466,403 B1 * 10/2002 Sato et al. ................ 360/126

* cited by examiner

Primary Examiner—William Korzuch
Assistant Examiner—Christopher R. Magee
(74) Attorney, Agent, or Firm—Sonnenschein Nath & Rosenthal LLP

(57) ABSTRACT

A magnetic tunnel effect type magnetic head comprising a first soft magnetic conductive layer which is to provide a lower shielding layer 24, a metal oxide layer 25 and a first nonmagnetic conductive layer, formed on the first soft magnetic conductive layer, to provide a lower gap layer 26, a magnetic tunnel junction layer 34 formed on the first nonmagnetic conductive layer to provide a magnetic tunnel junction element 27, a second nonmagnetic conductive layer formed on the magnetic tunnel junction layer 34 to provide an upper gap layer 28; and a second soft magnetic conductive layer formed on the second nonmagnetic conductive layer to provide an upper shielding layer 29, the metal oxide layer 25 in the lower gap layer 26 being formed beneath at least the magnetic tunnel junction layer 27.

1 Claim, 29 Drawing Sheets

MAGNETIC TUNNEL EFFECT TYPE MAGNETIC HEAD, AND METHOD OF PRODUCING SAME

RELATED APPLICATION DATA

The present application is a continuation of U.S. application Ser. No. 09/898,259, filed Jul. 3, 2001 now U.S. Pat. No. 6,873,502, and claims priority to Japanese Application No. P2000-205927 filed Jul. 6, 2000, all of which are incorporated herein by reference to the extent permitted by law.

BACKGROUND OF THE INVENTION

1. Field of the Invention

The present invention relates to a magnetic tunnel effect type magnetic head used in a hard disc drive, magnetic tape drive, etc. to read signals from a magnetic recording medium under the magnetic tunnel effect, and a method for producing the same.

2. Description of the Related Art

It is well known as a so-called magnetic tunnel effect that in a laminated structure having a thin insulative layer sandwiched between a pair of magnetic layers, when a predetermined voltage is applied between the pair of magnetic layers, the conductance of a so-called tunnel current varies depending upon the relative angle of magnetization between the pair of magnetic layers. That is, the laminated structure having the thin insulative layer sandwiched between the pair of magnetic layers shows a magneto-resistive effect to the tunnel current flowing through the insulative layer.

With the magnetic tunnel effect, it is possible to theoretically calculate the magneto-resistive coefficient or ratio between the pair of magnetic layers owing to the polarizability of the magnetic layers when magnetized, and more specifically, to have a magneto-resistive coefficient or ratio of about 40% in case the pair of magnetic layers is formed from Fe.

Thus, as a magneto-resistive effect element, the magnetic tunnel junction element (will be referred to as "TMR element" hereunder) having a laminated structure having a thin insulative layer sandwiched between a pair of magnetic layers has been attracting the attention in the field of this art. Especially in the field of magnetic heads, attention is focused on a so-called magnetic tunnel effect type magnetic head (will be referred to as "TMR head" hereunder) using the TMR element as a magneto-sensitive element to detect a magnetic signal from a magnetic recording medium.

The above TMR head is a shielded TMR head in which for example a TMR element is sandwiched between a pair of magnetic shielding layers with gap layers laid between them. By permitting the pair of magnetic shielding layers to work as electrodes, the gap between the pair of shielding layers and TMR element can be reduced.

That is, the conventional shielded MR head is composed of a soft magnetic layer which is to be a lower shielding layer, a nonmagnetic nonconductive layer formed on the soft magnetic layer and which is to be a lower gap layer, an MR (magneto-resistive) element formed on the nonmagnetic nonconductive layer and a pair of conductive layers formed at both ends, respectively, of the MR element, a nonmagnetic nonconductive layer formed on the MR element and pair of conductive layers and which is to be an upper gap layer, and a soft magnetic layer formed on the nonmagnetic nonconductive layer and which is to be an upper shielding layer.

In the shielded MR head, as the gap is decreased for a higher recording density, the nonmagnetic nonconductive layer which is to be the gap layer is thinner. More specifically, because of steps formed by the pair of conductive layers disposed on the opposite ends of the MR element, it is difficult to form the upper nonmagnetic nonconductive layer to a uniform thickness over the MR element. In case the distance between the pair of magnetic shielding layers and the MR element, that is, the so-called gap length, is decreased for playing back a signal recorded with a high density in a magnetic recording medium, it is extremely difficult to secure an insulation between the pair of magnetic shielding layers and the MR element.

On the contrary, in the TMR head, the pair of magnetic shielding layers function as electrodes so that the gap layer can be made thin and thus the distance between the pair of magnetic shielding layers and the TMR element can be decreased. Therefore, in the TMR head, the gap can be made narrow to enable a high density of recording to a magnetic recording medium.

In the conventional shielded TMR head, the pair of magnetic shielding layers having the TMR element sandwiched with the gap layers between them serves also as a magnetic shield which prevents a portion, not to be read, of a signal magnetic field from a magnetic recording medium from being led to the TMR element. For this purpose, the pair of magnetic shielding layers is formed from soft magnetic layers having a conductivity such as NiFe, FeAlSi or the like.

For the magnetic shielding function of the pair of magnetic shielding layers in the shielded TMR head, the soft magnetic layers which are to be the pair of magnetic shielding layers is as thick as about several micrometers ($\mu m$) while an insulative layer of aluminum oxide for example, sandwiched between the pair of magnetic layers, of a magnetic tunnel junction layer which is to be the TMR element is as thin as about 1 nm.

In such a shielded TMR head, since the soft magnetic layers for the pair of magnetic shielding layers is very thick, the surface of the soft magnetic layer is very rough. For this reason, for production of the shielded TMR head, the soft magnetic layer, after formed, had to be polished by the so-called chemical and mechanical polishing (CMP) so that the surface of the soft magnetic layer on the lower shielding layer, on which the magnetic tunnel junction layer is to be formed, could be smooth.

Generally, however, the surface roughness of the soft magnetic layer, resulted from the chemical and mechanical polishing (CMP), is on the order of 0.3 nm in center line average height Ra. Thus, in the shielded TMR head, since the insulative layer of the magnetic tunnel junction layer which is to be the TMR element is as thin as about 1 nm, when the surface roughness of the soft magnetic layer at the lower shielding layer side is about 0.3 nm in center line average height Ra, the insulative layer of the magnetic tunnel junction layer is ruptured between the pair of magnetic layers and put into contact with each other, resulting in an electric short-circuit as the case may be.

In this case, since the tunnel current flowing via the insulative layer of the TMR element decreases in the TMR head, so the magneto-resistive coefficient of the TMR element also decreases with a result that the playback output will be considerably small.

OBJECT AND SUMMARY OF THE INVENTION

It is therefore an object of the present invention to overcome the above-mentioned drawbacks of the prior art by providing a magnetic tunnel effect type magnetic head in which a magnetic tunnel junction layer which is to be a magnetic tunnel junction element can be formed on a very, smooth surface and having a considerably improved quality and reliability, and a method of producing the same.

The above object can be attained by providing a magnetic tunnel effect type magnetic head including, according to the present invention a first soft magnetic conductive layer which is to provide a lower shielding layer, a metal oxide layer and first nonmagnetic conductive layer, formed on the first soft magnetic conductive layer, to provide a lower gap layer, a magnetic tunnel junction layer formed on the first nonmagnetic conductive layer to provide a magnetic tunnel junction element, a second nonmagnetic conductive layer formed on the magnetic tunnel junction layer to provide an upper gap layer and a second soft magnetic conductive layer formed on the second nonmagnetic conductive layer to provide an upper shielding layer. The metal oxide layer in the lower gap layer is formed beneath at least the magnetic tunnel junction layer.

In the above magnetic tunnel effect type magnetic head, since the metal oxide layer formed on the first soft magnetic conductive layer to provide the lower shielding layer has a good surface roughness and the magnetic tunnel junction layer is formed right above the metal oxide layer superior in smoothness to provide the magnetic tunnel junction element, the magnetic tunnel junction element has a good magneto-resistive coefficient and provides a stable playback output.

Also the above object can be attained by providing a method of producing a magnetic tunnel effect type magnetic head, including, according to the present invention, steps of forming a first soft magnetic conductive layer to provide a lower shielding layer, forming, on the first soft magnetic conductive layer, a metal oxide layer and first nonmagnetic conductive layer to provide a lower gap layer, forming, on the first nonmagnetic conductive layer, a magnetic tunnel junction layer to provide a magnetic tunnel junction element, forming, on the magnetic tunnel junction layer, a second nonmagnetic conductive layer to provide an upper gap layer and forming, on the second nonmagnetic conductive layer, a second soft magnetic conductive layer to provide an upper shielding layer. The metal oxide layer in the lower gap layer is formed beneath at least the magnetic tunnel junction layer.

In the above method of producing a magnetic tunnel effect type magnetic head, since the metal oxide layer having a good surface roughness is formed on the first soft magnetic conductive layer to provide the lower shielding layer and the magnetic tunnel junction layer is formed right above the metal oxide layer superior in smoothness to provide the magnetic tunnel junction element, it is possible to prevent the magneto-resistive coefficient of the magnetic tunnel junction element from being lower and easily produce a yield-improved, high-quality magnetic tunnel effect type magnetic head.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Note that the drawings referred to in the following description were prepared with characteristic portions of the magnetic head being enlarged in scale for easier understanding and thus not all the dimensional ratios between the component elements of the magnetic head are the same as those in the actual magnetic head according to the present invention.

Figure 1:
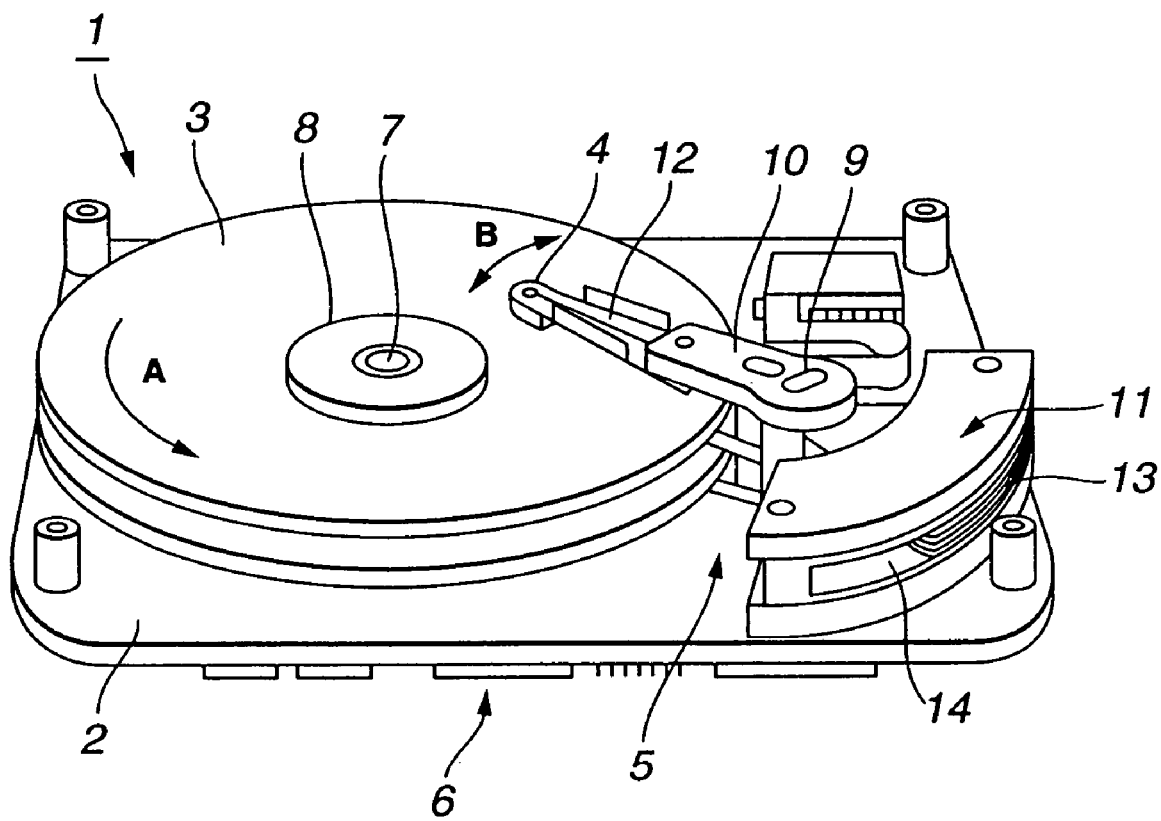
FIG. 1 is a schematic perspective view of an example of hard disc drive.

Referring now to FIG. 1, there is schematically illustrated in the form of a schematic perspective view a hard disc drive as an embodiment of the present invention. The hard disc drive body is generally indicated with a reference 1. Normally, the hard disc drive body 1 is encased in an enclosure (not shown). As shown, the hard disc drive body 1 has a chassis 2 on which there are provided magnetic discs 3 rotated by a spindle motor (not shown), and a head actuator 5 provided at an end thereof with a head slider 4 having mounted thereon a magnetic head which writes or read an information signal to or from the magnetic disc 3.

The hard disc drive is further provided, on a side of the chassis 2 opposite to the side on which the magnetic disc 3, head actuator 5 etc. are installed, with a signal processing circuit to process the information signal at the time of information write or read, control circuits 6 including a servo control circuit for servo control of the magnetic head, system controller to control the entire system and other control circuits.

The magnetic disc 3 is a so-called hard disc, and includes a generally disc-shaped substrate having a central hole formed therein, and a magnetic layer, protective layer, etc. formed one on the other on the substrate. In this hard disc drive, a plurality of magnetic discs 3 is fitted at the central hole thereof on a rotary shaft 7 of the spindle motor and fixed by a damper 8. As the spindle motor controlled by the control circuit is rotated, the magnetic disc 3 is rotated at a predetermined velocity in the direction of arrow A in FIG. 1.

The head actuator 5 includes a support arm 10 pivotable about a spindle 9 thereof, a voice coil motor 11 provided at one end of the support arm 10, a suspension 12 fixed at the other end of the support arm 10 and having a predetermined elasticity, and the head slider 4 installed to the free end of the suspension 12.

The voice coil motor 11 has a coil 13 installed to the support arm 10 and a magnet 14 installed to the chassis 2 oppositely to the coil 13. When supplied with a current, the coil 13 generates a magnetic field, and the magnetic action with the magnet 14 disposed opposite to the coil 13 will have the support arm 10 rotate through a predetermined angle about the spindle 9 in the direction of arrow B in FIG. 1, that is, radially of the magnetic disc 3.

Further, the suspension 12 has the head slider 4 mounted on the free end thereof. It elastically forces the head slider 4 towards the magnetic disc 3 while supporting the had slider 4.

Figure 2:
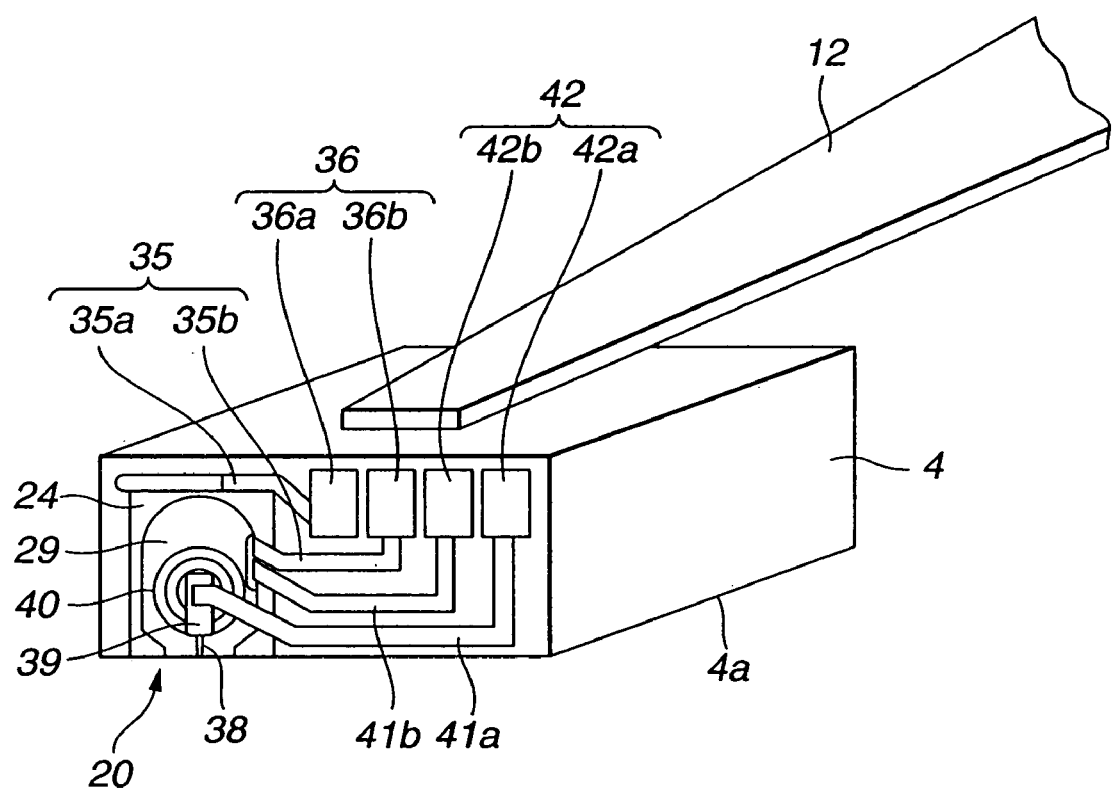
FIG. 2 is a schematic perspective view of a head slider of the hard disc drive shown in FIG. 1.

As will be seen from FIGS. 1 and 2, the head slider 4 is molded to be generally rectangular and so supported on the free end of each suspension 12 of each support arm 10 provided for each magnetic disc 3 as to be opposite to the signal recording layer of the magnetic disc 3. Also, the head slider 4 has a surface 4a opposite to the magnetic disc 3 (the surface will be referred to as "medium-opposite face" hereunder), on which there is formed an airborne surface (ABS) to produce a levitation force by an air flow produced when the magnetic disc 3 is rotated.

More specifically, while the head slider 4 installed at the free end of the suspension 12 is being levitated a predetermined distance off and over the magnetic disc 3 by an air flow produced by the magnetic disc 3 being rotated, the magnetic head 20 mounted on the head slider 4 writes or reads a signal to or from the signal recording layer of the magnetic disc 3. Note that the shape of the ABS surface of the head slider 4 is not limited to any special one but may be an arbitrary one.

The magnetic head is generally indicated with a reference 20. As shown in FIG. 1, the magnetic head 20 is positioned at the rear end of the head slider 4 traveling in levitation oppositely to the magnetic disc 3 rotated in the direction of arrow A in FIG. 1.

Figure 3:
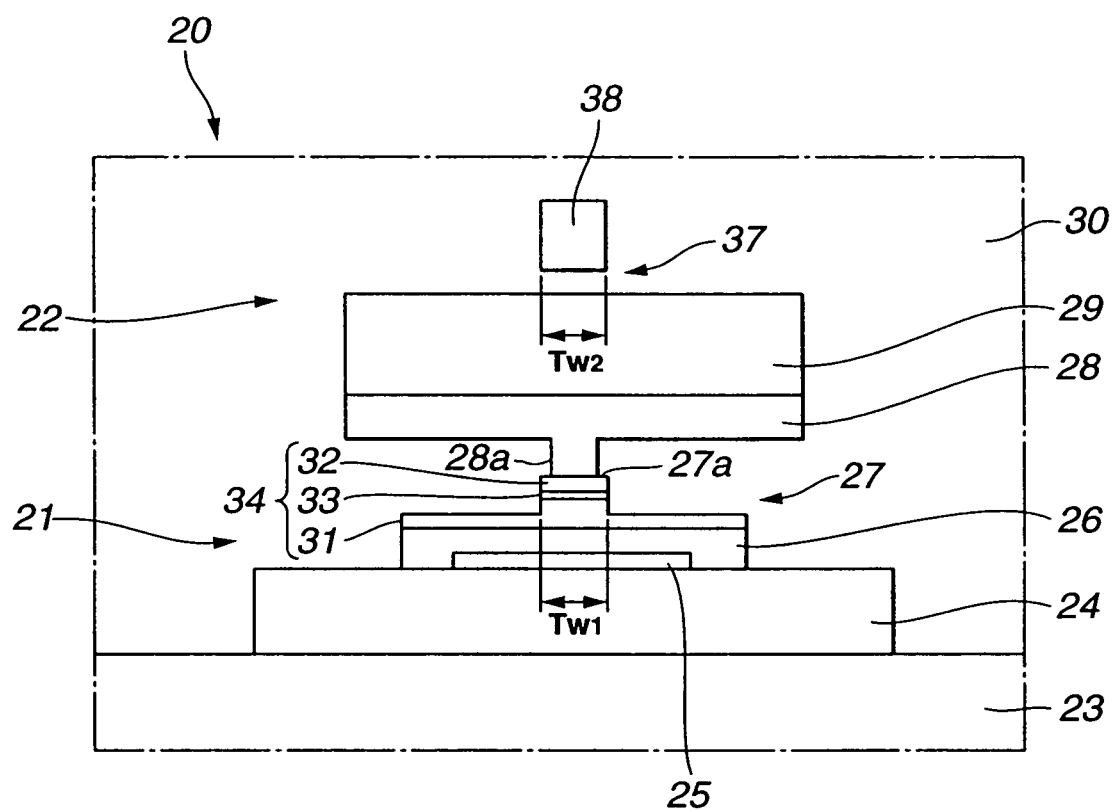
FIG. 3 is an end view of the essential portion of the magnetic head according to the present invention, from the face thereof opposite to a recording medium.

As shown in FIGS. 2 and 3, the magnetic head 20 is a composite type thin-film magnetic head including a combination of a magnetic tunnel effect type magnetic head (will be referred to as "TMR head" hereunder) 21 as a read head and an inductive type thin-film head 22 as a write head, for example. Note that FIG. 3 is a schematic end view of the magnetic head 20 from the medium-opposite face 4a.

In the magnetic head 20, component elements such as the read and write heads are formed by a thin-film forming technology such as plating, sputtering or the like. Therefore, advantageously, the track and gap can easily be reduced in size and write/read be done with a high resolution.

More particularly, the magnetic head 20 is produced by adopting a thin-film laminating process which will further be described later. In the magnetic head 20, the TMR head 21 as a read head to read a signal from the magnetic disc 3 under the magnetic tunnel effect is formed on a substrate 23 of a hard nonmagnetic material such as alumina titanium carbide ($AL_2O_3$—TiC), and the inductive type thin-film head 22 as a write head to write a signal to the magnetic disc 3 by the action of electromagnetic induction. In the magnetic head 20, the component elements forming each of the read and write heads are exposed from the medium-opposite face 4a and generally flush with each other.

The TMR head 21 and inductive type thin-film head 22 will further be described below. First, the above TMR head 21 is a so-called shielded TMR head including a magnetic tunnel junction element (will be referred to as "TMR element" hereunder) sandwiched with shielding gap layers between a pair of upper and lower magnetic shielding layers. More specifically, the TMR head 21 includes a lower shielding layer 24 formed on the substrate 23, a nonmagnetic nonconductive layer 25 formed on the lower shielding layer 24, a lower nonmagnetic conductive layer 26 formed on the lower nonmagnetic nonconductive layer 25, a TMR element 27 formed on the nonmagnetic conductive layer 26, an upper nonmagnetic conductive layer 28 formed on the TMR element 27, and an upper shielding layer 29 formed on the upper nonmagnetic conductive layer 28. A nonmagnetic nonconductive material 30 such as $Al_2O_3$ is filled in the space around the layers including from the substrate 23 to the upper shielding layer 29.

The TMR element 27 is a magnetic sensor which detects a signal from the magnetic disc 3 under the so-called magnetic tunnel effect. The magnetic tunnel effect is such that the conductance of a tunnel current flowing through the TMR element 27 varies depending upon the direction of magnetization by a magnetic field from the magnetic disc 3. The magnetic tunnel effect is used to detect a voltage change of the tunnel current and read a signal recorded in the magnetic disc 3.

More specifically, the TMR element 27 includes a magnetic tunnel junction layer 34 formed by laminating a fixed-magnetization layer 31 magnetizable only in a predetermined fixed direction and a free-magnetization layer 32 magnetizable in a direction which varies depending upon an external magnetic field, with a tunnel barrier layer 33 laid between these layers 30 and 31.

In the magnetic tunnel junction layer 34, the fixed-magnetization layer 31 has a three-layer structure in which, for example, an NiFe layer of 3 nm in thickness, IrMn layer of 10 nm in thickness and a CoFe layer of 4 nm in thickness are laminated one on the other on a Ta layer of 3 nm in thickness formed as a lower layer on the lower nonmagnetic conductive layer 26. The above IrMn layer is an antiferromagnetic layer which is in exchange coupling with the CoFe layer which is thus magnetized in a predetermined direction.

Also, the tunnel barrier layer 33 is for example an aluminum oxide ($Al_2O_3$) layer of 1.3 nm in thickness as an insulative layer formed on the CoFe layer of the fixed-magnetization layer 31.

The free-magnetization layer 32 is of a two-layer structure in which for example, a CoFe layer of 4 nm in thickness is formed on the tunnel barrier layer 33 and an NiFe layer of 5 nm in thickness is formed on the CoFe layer. Further on the free-magnetization layer 32, there is formed for example a Ta layer of 5 nm in thickness as an upper layer. The above CoFe layer is intended to increase the spin polarizability. The NiFe layer has a small coercive force and thus is magnetizable in a direction depending upon the external magnetic field. These CoFe and NiFe layers form together a magnetic sensor 27a of the TMR element 27.

By making the magnetic tunnel junction layer 34 from such a spin valve laminated structure, the TMR element 27 can have a large magneto-resistive coefficient or ratio. Note that the materials and thickness of the layers forming the magnetic tunnel junction layer 34 are not limited to those having been described in the above but the layers may be formed from materials appropriately selected and in appropriate thickness, respectively, according to the purpose of use of the TMR element 27.

The TMR element 27 is etched in a range from the free-magnetization layer 32 to the middle of the fixed-magnetization layer 31 while leaving not etched the portion of the magnetic tunnel junction layer 34 which is to be the magnetic sensor 27a of the TMR element 27, so that the track width $Tw_1$ relative to the magnetic disc 3 is limited. Note that in this embodiment, the track width $Tw_1$ is about 5 µm but it may be an appropriate value set according to the system requirement etc.

In the TMR head 21, the lower shielding layer 24 and lower nonmagnetic conductive layer 26 function as electrodes of the fixed-magnetization layer 31 of the TMR element 27 while the upper shielding layer 29 and upper nonmagnetic conductive layer 28 function as electrodes of the fee-magnetization layer 32, so that a tunnel current will flow through the tunnel barrier layer 33 to the TMR element 27.

More particularly, the lower and upper nonmagnetic conductive layers 26 and 18 are formed from a nonmagnetic conductive material such as Cu. In the lower nonmagnetic conductive layer 26, the fixed-magnetization layer 31 of the TMR element 27 is electrically connected to the lower shielding layer 24. On the other hand, the upper nonmagnetic conductive layer 28 has a projection 28a which abuts a portion of the TMR element 27 which is to be the magnetic sensor 27a, and thus the free-magnetization layer 32 of the TMR element 27 and the upper shielding layer 29 are electrically connected to each other via the projection 28a.

The lower nonmagnetic conductive layer 26 and upper nonmagnetic conductive layer 28 form, together with the nonmagnetic nonconductive layer 25 and nonmagnetic nonconductive material 30 disposed in a clearance between the TMR element 27 and the lower and upper shielding layers 24 and 29, a shielding gap layer which magnetically isolates the TMR element 27 and the lower and upper shielding layer 24 and 29 from each other.

The nonmagnetic nonconductive layer 25 is formed from a metal oxide layer such as aluminum oxide ($Al_2O_3$) or silicon dioxide ($SiO_2$) beneath the TMR element 27. In the process of producing the TMR head 21, which will further be described later, the nonmagnetic nonconductive layer 25 is polished at the surface thereof by the CMP (chemical and mechanical polishing) method to a center line average height Ra of less than 0.2 nm to assure a very smooth surface beneath the TMR element 27. Note that in this embodiment, the metal oxide layer is alumina layer ($Al_2O_3$) but is not limited to the alumina. It may be silicon dioxide for example so long as it can assure a surface roughness of less than 0.2 nm in center line average height Ra.

The lower and upper shielding layers 24 and 29 are formed each from an amorphous lamination layer of CoZrN-bTa of 2.3 µm in thickness for example. The lower and upper shielding layers 24 and 29 will supply an electricity to the TMR element 27 through the lower and-upper nonmagnetic conductive layers 26 and 28.

The lower and upper shielding layers 24 and 29 are wide enough to magnetically shield the TMR element 27 and thus provide a pair of magnetic shielding layers which sandwiches the TMR element 27 between the lower and upper nonmagnetic conductive layers 26 and 28 laid between them, thereby preventing a portion, not to be read, of a signal magnetic field from the magnetic disc 3 from being led to the TMR element 27. That is, in the TMR head 21, a signal magnetic field not to be read by the TMR element 27 is led to the lower and upper shielding layers 24 and 29 while only a signal magnetic field to be read is led to the TMR element 27. Thus, in the TMR head 21, the TMR element 27 has an improved frequency characteristic and reading resolution.

In the TMR head 21, the distance between the lower and upper shielding layers 24 and 29 and the TMR element 27 is a so-called gap length.

In the TMR head 21, there are provided lead wires 35a and 35b electrically connected to the lower and upper shielding layers 24 and 29, respectively, as shown in FIG. 2. External connection terminals 36a and 36b are provided at ends of the lead wires 35a and 35b so as to be exposed from the read end face of the head slider 4.

The lead wires 35a and 35b are formed thin from a conductive material such as copper (Cu). Also, the external connection terminals 36a and 36b are formed from a conductive material such as gold (Au), and can be put into contact with an external circuit when conductors also formed from gold (Au) are electrically connected to wiring terminals provided on the suspension 12 by wire bonding or the like method.

On the other hand, the inductive type thin head 22 includes, as shown in FIGS. 2 and 3, a lower core layer 29 formed from the same material as that of the upper shielding layer 29, an upper core layer 38 formed on the lower core layer 29 with a magnetic gap 37 laid between them, a back yoke 39 joined to the upper core layer 38 and forming together with the lower core layer 29 a back gap at the other end spaced from the medium-opposite face 4a. The clearance between the lower and upper core layers 29 and 38 is filled also with the nonmagnetic nonconductive material 30 such as $Al_2O_3$ for example.

In the inductive type thin-film head 22, there are provided between the lower core layer 29 and back yoke 39 a thin-film coil 40 wound about the back gap and lead wires 41a and 41b electrically connected between the inner circumferential end and outer circumferential end of the thin-film coil 40. External connection terminals 42a and 42b are provided at ends of the lead wires 41a and 41b so as to be exposed from the read end of the head slider 4.

The lower and upper core layers 29 and 38 and back yoke 39 form together a magnetic core being a closed magnetic circuit. The upper core layer 38 is molded from a conductive soft magnetic material such as amorphous lamination layer to have a predetermined width. The upper core layer 38 is disposed opposite to the lower core layer 29 with the nonmagnetic nonconductive material 30 laid between them to form the magnetic gap 37 whose width is a track width $Tw_2$. Note that the track width $Tw_2$ may be an appropriate value set according to the system requirement etc.

Note that in the inductive type thin-film head 22, a fringing field taking place at the magnetic gap 37 can be thinned by forming a concavity in the lower core layer 29 oppositely to the upper core layer 38 whose width corresponds to the track width $Tw_2$, whereby even a weak magnetic signal can be recorded to the magnetic disc 3 with a high accuracy.

The thin-film coil 40 is spirally formed from a conductive materials such as Cu.

The lead wires 41a and 41b are formed thin from a conductive material such as Cu similarly to the aforementioned lead wires 35.

Also, the external connection terminals 42a and 42b are formed from a conductive material such as gold (Au) similarly to the aforementioned external connection terminals 36 (36a and 36b), and can be put into contact with an external circuit when conductors also formed from gold (Au) are electrically connected to wiring terminals provided on the suspension 12 by wire bonding or the like method.

In the magnetic head 20, the head slider 4 has formed on the rear end face thereof except for a portion thereof where the external connection terminals 36 and 42 are exposed a protective layer of the nonmagnetic nonconductive material 30 such as $Al_2O_3$ to protect the thin-film coil 40 and lead wires 35 and 41.

When a signal is read from the magnetic disc 3 by the TMR head 21 of the magnetic head 20 constructed as having been described in the foregoing, a predetermined voltage is applied between the fixed-magnetization layer 31 and free-magnetization layer 32 of the TMR element 27. At this time, the conductance of a tunnel current flowing through the tunnel barrier layer 33 of the TMR element 27 varies correspondingly to a signal magnetic field from the magnetic disc 3. Thus, in the TMR head 21, the voltage value of the tunnel current through the TMR element 27 will vary. By detecting a variation of the voltage value of the TMR element 27, the signal can be read from the magnetic disc 3.

On the other hand, when a signal is written to the magnetic disc 3 by the inductive type thin-film head 22, the thin-film coil 40 is supplied with a current corresponding to a signal to be written. At this time, in the inductive type thin-film head 22, a magnetic field from the thin-film coil 40 will give a magnetic flux to the magnetic core and cause a fringing field to take place from the magnetic gap 37. Thus, with the inductive type thin-film head 22, the signal can be written to the magnetic disc 3 by applying the fringing field to the magnetic disc 3.

In the magnetic head 20, the TMR head 21 being a read head is the magnetic tunnel effect type magnetic head according to the present invention, and a metal oxide layer forming the nonmagnetic nonconductive layer 25 formed on the lower shielding layer 24 is provided beneath the TMR element 27.

More particularly, the metal oxide layer forming the nonmagnetic nonconductive layer 25 in the TMR head 21, after formed, is polished by the CMP method to a surface roughness of less than 0.2 nm in center line average height Ra to provide a very smooth surface. The magnetic tunnel junction layer 34 which provides the TMR element 27 is formed beneath the very smooth metal oxide layer.

Thus, with the TMR head 21, it can be prevented that the tunnel barrier layer 33 formed extremely thin will be ruptured between the fixed- and free-magnetization layers 31 and 32 in the magnetic tunnel junction layer 34 and the layers 31 and 32 will thus be put into contact with each other, resulting in an electric short-circuit between them. Therefore, in the TMR head 21, it is possible to prevent the magneto-resistive coefficient of the TMR element 27 from decreasing and provide a stable playback output.

Next, the method of producing the head slider 4 on which the magnetic head 20 having been described in the foregoing is mounted will be described.

Note that in the drawings referred to in the following description, characteristic portions of the magnetic head are enlarged in scale as in FIGS. 1 to 3 for easier understanding and thus not all the dimensional ratios between the component elements are the same as those in the actual magnetic head according to the present invention. Also, in the following description, component elements of the magnetic head 20, materials, sizes and layer thickness of the component elements will be described in detail; however, the present invention are not limited to the embodiments which will be described herebelow. For example, a so-called shielded TMR head having a similar structure to that actually used in the hard disc drives will be described by way of example in the following but it may be a magnetic head of a so-called yoke type using a soft magnetic material as a part of the magnetic circuit. Namely, the present invention is not always limited to such an example.

Figure 4:
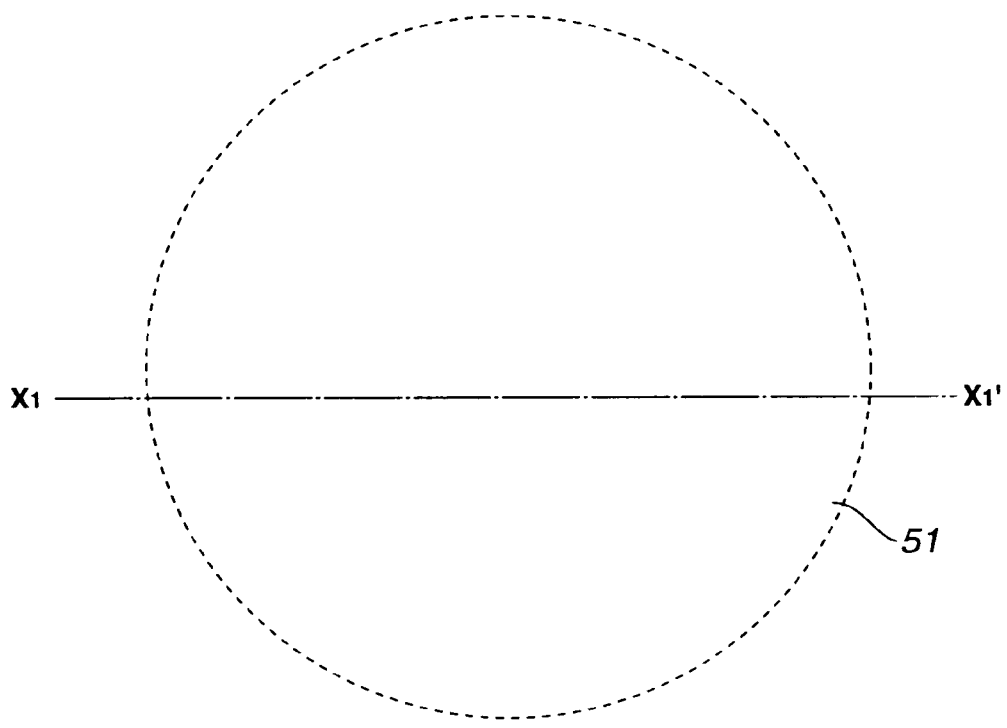
FIG. 4 is a schematic plan view of a first soft magnetic layer formed on a substrate in the process of head slider production.
Figure 5:
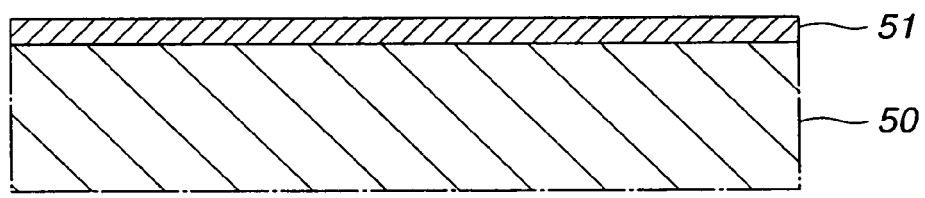
FIG. 5 is a schematic sectional view taken along the line $X_1$–$X_1'$ in FIG. 4

Referring now to FIGS. 4 and 5, there is illustrated a plan view of a first soft magnetic layer formed on a substrate in the process of head slider production. FIG. 4 is a schematic plan view of the first soft magnetic layer, and FIG. 5 is a schematic sectional view taken along the line $X_1-X_1'$ in FIG. 4. First in the production of the magnetic head 20, there is prepared a disc-like substrate 50 of about 4 inches in diameter for example, as shown in FIGS. 4 and 5. The surface of the substrate 50 is mirror-finished. Then, a first soft magnetic conductive layer 51 which is to be the lower shielding layer 24 is formed on the substrate 50 by sputtering or the like method.

The substrate 50 is to finally be the substrate 23 of the aforementioned magnetic had 20. After various component elements of the magnetic head 20 are formed one after another on the main side of the substrate 50 by the thin-film forming process, the substrate 50 is cut into individual head chips, whereby a plurality of head sliders 4 each having the magnetic head 20 mounted thereon can be produced collectively.

Note that the substrate 50 should preferably be formed from alumina titanum carbide ($Al_2O_3$—TiC) or the like. On the other hand, the first soft magnetic conductive layer 51 is formed from an amorphous lamination layer of CoZrNbTa of 2.3 µm in thickness for example.

Figure 6:
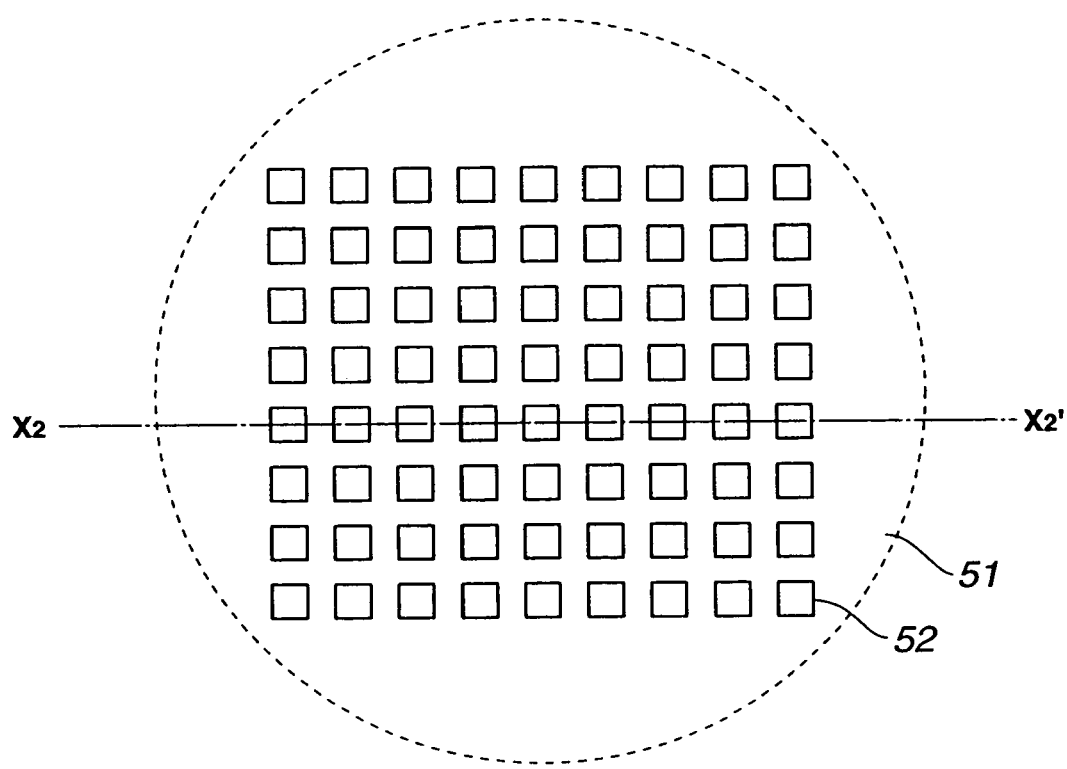
FIG. 6 is a schematic plan view of a first resist pattern formed on the first soft magnetic layer in the process of head slider production.
Figure 7:
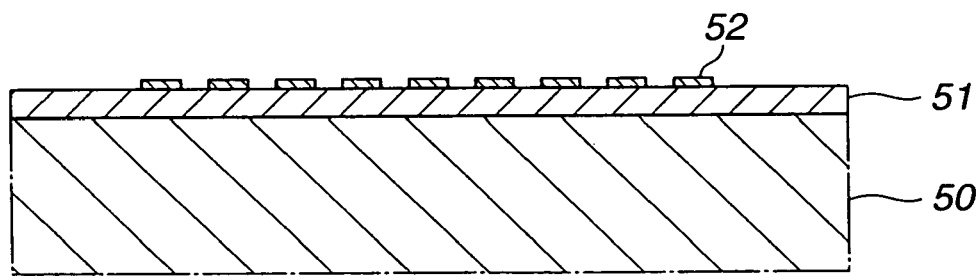
FIG. 7 is a schematic sectional view taken along the line $X_2$–$X_2'$ in FIG. 6

Next, referring to FIGS. 6 and 7, there is illustrated a first resist pattern formed on the first soft magnetic conductive layer 51 in the process of head slider production. FIG. 6 is a schematic plan view of the first resist pattern and FIG. 7 is a schematic sectional view taken along the line $X_2-X_2'$ in FIG. 6. A photoresist is applied to the first soft magnetic conductive layer 51 and cured to form a resist layer. The photolithography is utilized to pattern the resist layer to a predetermined form, thereby forming a first resist pattern 52 as shown in FIGS. 6 and 7. More specifically, for patterning the resist layer to have the predetermined pattern, first the resist layer is exposed correspondingly to a desired pattern. Next, the exposed portions of the resist layer are solved and removed in a developing solution, and then subjected to post-baking. Thus, a resist pattern of the predetermined form is provided.

Figure 8:
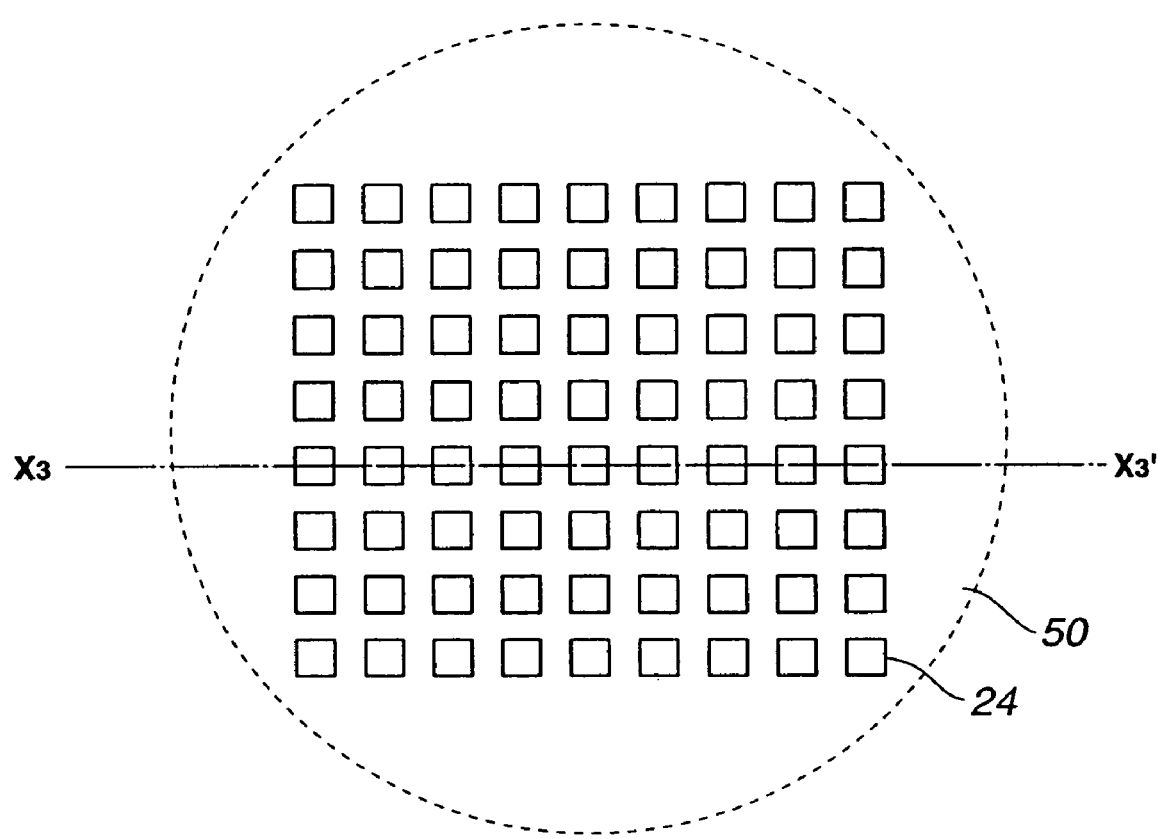
FIG. 8 is a schematic plan view of a lower shielding layer formed on the substrate in the process of head slider production.
Figure 9:
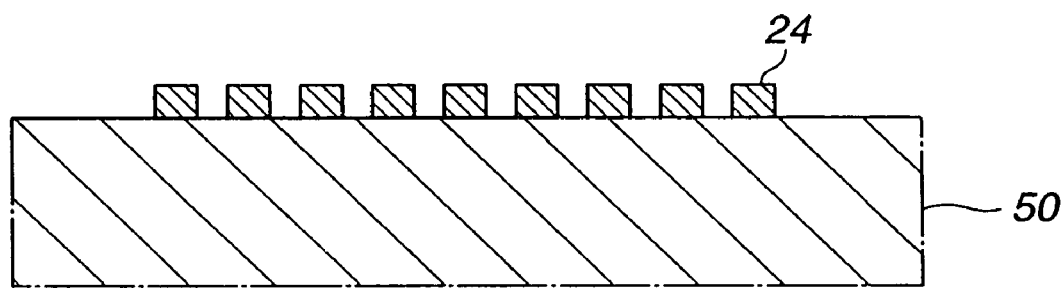
FIG. 9 is a schematic sectional view taken along the line $X_3$–$X_3'$ in FIG. 8.

Next, referring to FIGS. 8 and 9, there is illustrated the lower shielding layer 24 formed on the substrate 50 in the process of head slider production. FIG. 8 is a schematic plan view of the lower shielding layer 24 formed on the substrate 50 and FIG. 9 is a schematic sectional view taken along the line $X_3-X_3'$ in FIG. 8. Using the first resist pattern 52 as a mask, the first soft magnetic conductive layer 51 is etched by dry etching, and then the first resist pattern 52 is removed from on the first soft magnetic conductive layer 51. Thus, a plurality of lower shielding layers 24 having a predetermined form is formed as shown in FIGS. 8 and 9. Note that the lower shielding layer 24 should be formed sufficiently large to magnetically shield the lower layer of the TMR element 27 which is to be formed in the later process.

Figure 10:
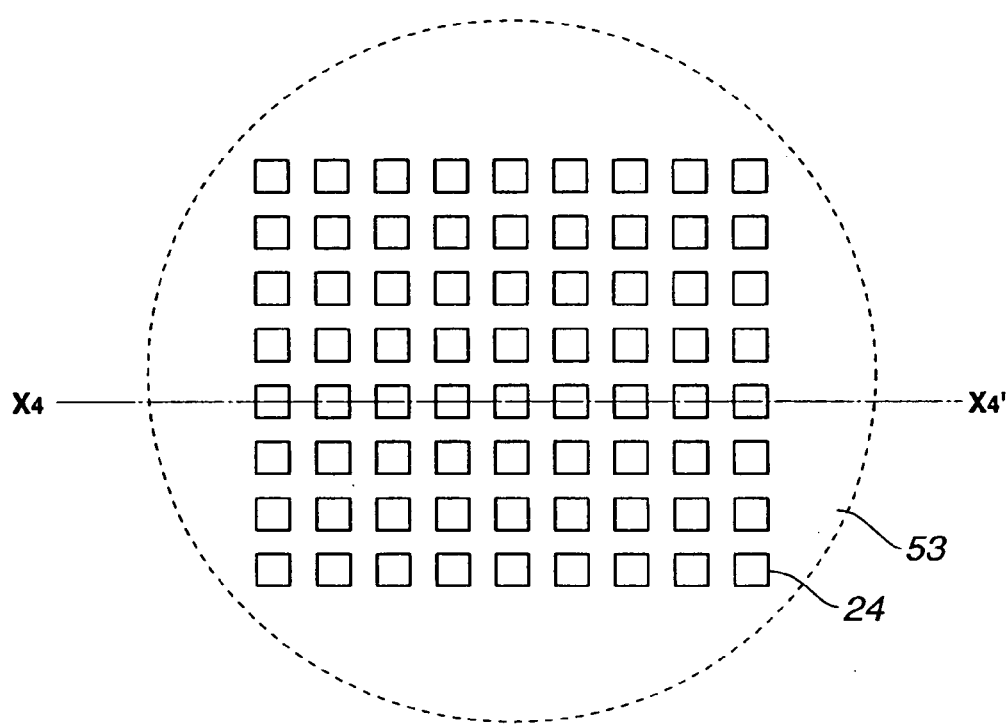
FIG. 10 is a schematic plan view of a first nonmagnetic nonconductive layer formed on the substrate and polished until the surface of the lower shielding layer is exposed, in the process of head slider production.
Figure 11:
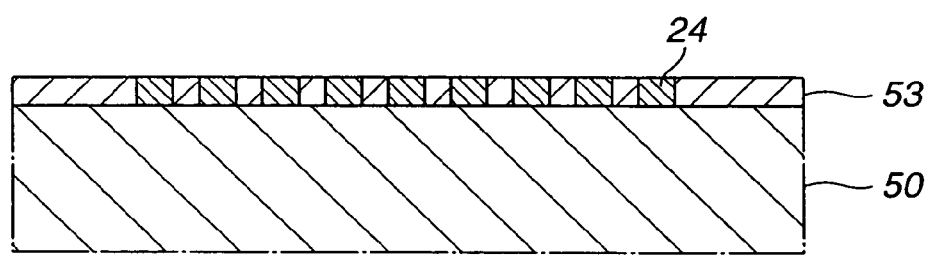
FIG. 11 is a schematic sectional view taken along the line $X_4$–$X_4'$ in FIG. 10.

Next, referring now to FIGS. 10 and 11, there is illustrated a first nonmagnetic nonconductive layer 53 formed on the substrate 50 and polished until the surface of the lower shielding layer 24 is exposed, in the process of head slider production. FIG. 10 is a schematic plan view of the first nonmagnetic nonconductive layer 53 formed on the substrate 50 and FIG. 11 is a schematic sectional view taken along the line $X_4-X_4'$ in FIG. 10. As shown, the first nonmagnetic nonconductive layer 53 is formed from $Al_2O_3$ for example by sputtering over the substrate 50, and then the layer 53 is polished until the plurality of lower shielding layers 24 formed on the substrate 50 is exposed. Thus, the first nonmagnetic nonconductive layer 53 is embedded between the substrate 50 and lower shielding layers 24 to provide a flat surface where the lower shielding layers are formed on the substrate 50.

Figure 12:
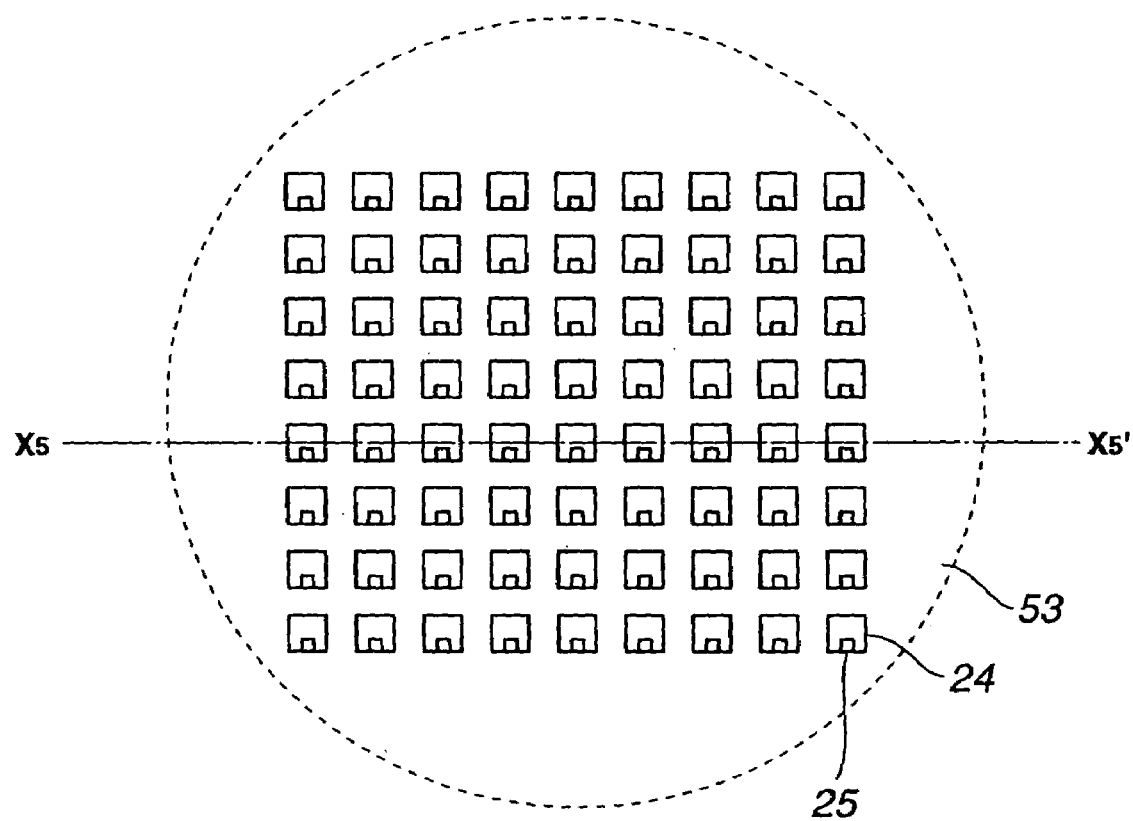
FIG. 12 is a schematic plan view of a nonmagnetic nonconductive layer formed on the flattened substrate in the process of head slider production.
Figure 13:
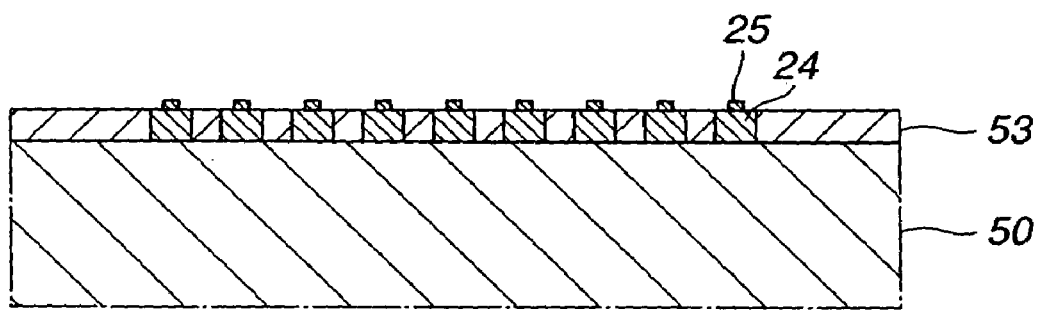
FIG. 13 is a schematic sectional view taken along the line $X_5$–$X_5'$ in FIG. 12.

Next, referring to FIGS. 12 and 13, there is illustrated the nonmagnetic nonconductive layer 25 formed on the flattened substrate 50 in the process of head slider production. FIG. 12 is a schematic plan view of the nonmagnetic nonconductive layer 25 formed on the flattened substrate 50 and FIG. 12 is a schematic sectional view taken along the line $X_5-X_5'$ in FIG. 13. A photoresist is applied on the flattened substrate 50 and cured to form a resist layer. The photolithography is utilized to pattern the resist layer to a predetermined form. The patterned resist layer is used to form a metal oxide layer of alumina layer ($Al_2O_3$) for example which is to be the nonmagnetic nonconductive layer 25. Thereafter, the resist layer is removed along with the metal oxide layer formed on the resist layer. Thus, the nonmagnetic nonconductive layer 25 having the predetermined form as shown in FIGS. 12 and 13 is formed on the lower shielding layer 24 beneath the TMR element 27 which will further be described later.

Further, the metal oxide layer is polished, after formed, by the CMP (chemical and mechanical polishing) method. Thus, the metal oxide layer is smoothed or polished to a surface roughness of less than 0.2 nm in center line average height Ra. Note that in this embodiment, the metal oxide layer is alumina layer ($Al_2O_3$) but is not limited to the alumina. It may be silicon dioxide for example so long as it can assure a surface roughness of less than 0.2 nm in center line average height Ra.

Figure 14:
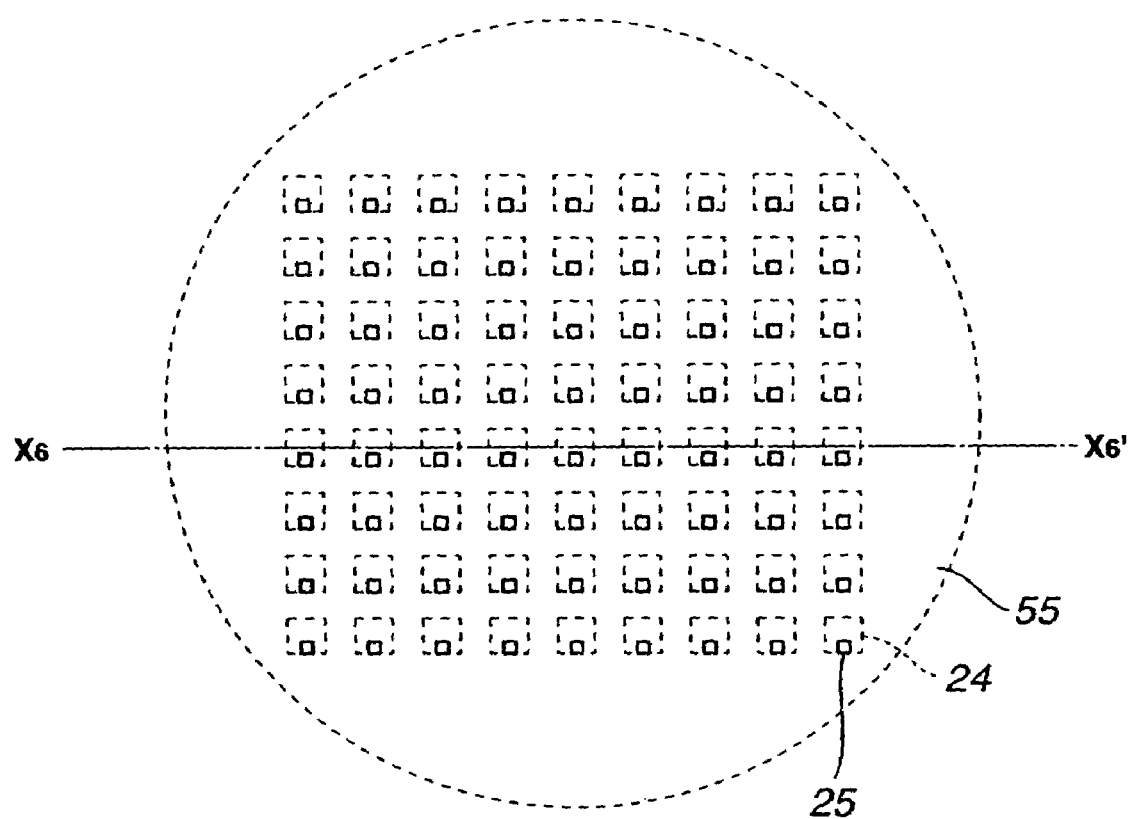
FIG. 14 is a schematic plan view of a first nonmagnetic conductive layer formed on the substrate in the process of head slider production.
Figure 15:
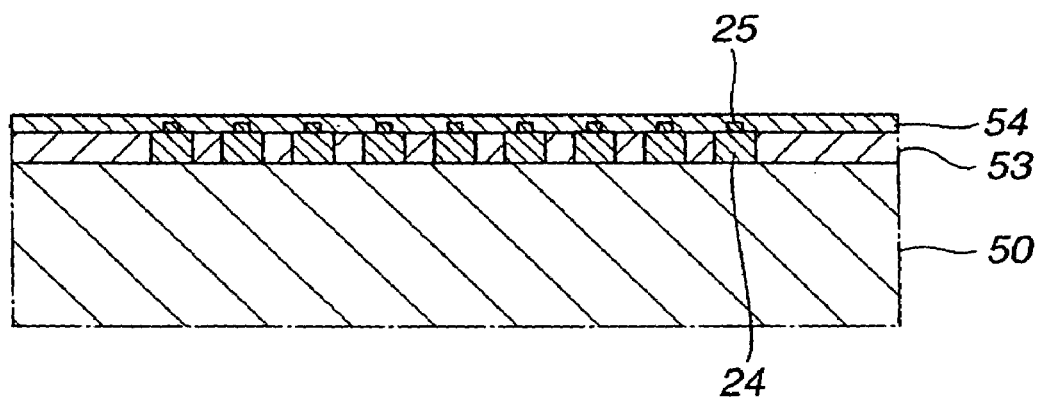
FIG. 15 is a schematic sectional view taken along the line $X_6$–$X_6'$ in FIG. 14.

Next, referring to FIGS. 14 and 15, there is illustrated a first nonmagnetic conductive layer 54 formed on the substrate 50 in the process of head slider production. FIG. 14 is a schematic plan view of the first nonmagnetic conductive layer 54, and FIG. 15 is a schematic sectional view taken along the line $X_6$–$X_6'$ in FIG. 14. As shown, the first nonmagnetic conductive layer 54 which provides the lower nonmagnetic conductive layer 26 is formed on the substrate 50 by sputtering or the like. The first nonmagnetic conductive layer 54 should preferably be formed from Cu or the like. The layer 54 may have an appropriate thickness set correspondingly to the frequency etc. of a signal recorded in a magnetic recording medium. The thickness is about 100 nm for example.

Figure 16:
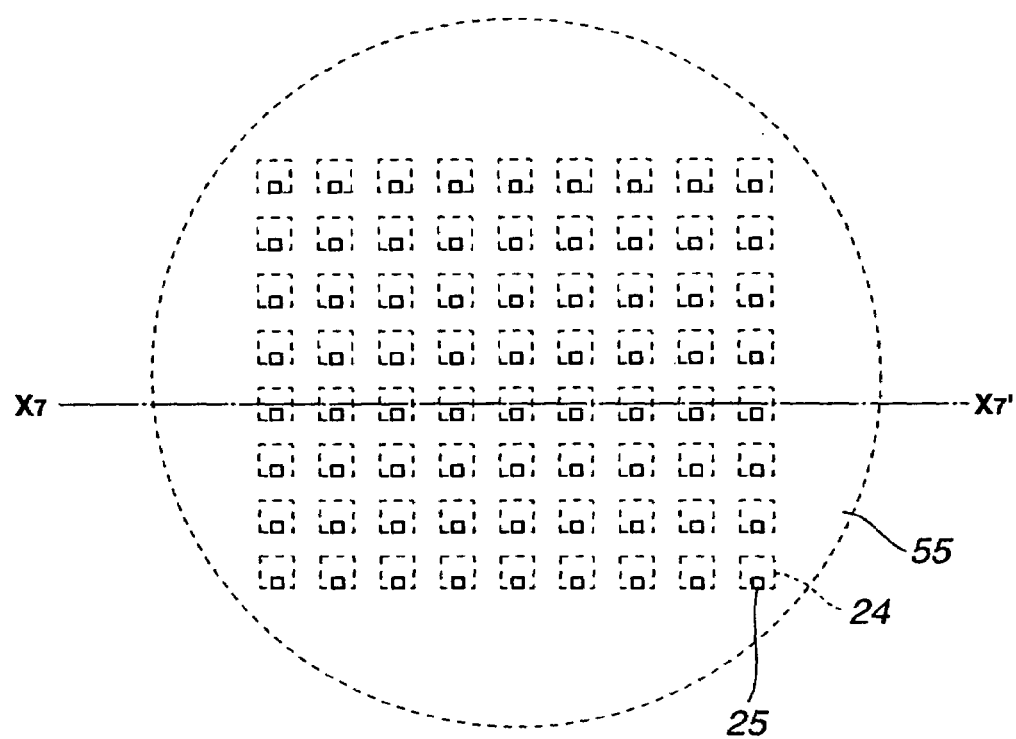
FIG. 16 is a schematic plan view of a magnetic tunnel junction layer formed on the first nonmagnetic conductive layer in the process of head slider production.
Figure 17:
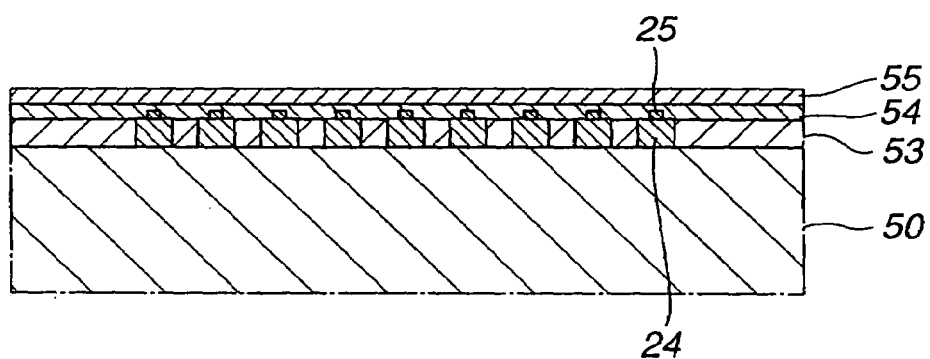
FIG. 17 is a schematic sectional view taken along the line $X_7$–$X_7'$ in FIG. 16.

Next, referring now to FIGS. 16 and 17, there is illustrated a magnetic tunnel junction layer 55 formed on the first nonmagnetic conductive layer 54 in the process of head slider production. FIG. 17 is a schematic plan view of the magnetic tunnel junction layer 55 formed on the first nonmagnetic conductive layer 54 and FIG. 17 is a schematic sectional view taken along the line $X_7$–$X_7'$ in FIG. 16. As shown, the magnetic tunnel junction layer 55 which is to be the aforementioned magnetic tunnel junction layer 34 is formed by sputtering or the like on the first nonmagnetic conductive layer 54.

As will be seen, the magnetic tunnel junction layer 55 is formed, by sputtering or the like, from a lamination of a Ta layer of 3 nm in thickness as a lower layer, a NiFe layer of 3 nm as the fixed-magnetization layer 31, an IrMn layer of 10 nm and CoFe layer of 4 nm, an aluminum oxide ($Al_2O_3$) layer of 1.3 nm as the tunnel barrier layer 33, a CoFe layer of 4 nm and NiFe layer of 5 nm as the free-magnetization layer 32, and a Ta layer of about 5 nm in thickness as an upper layer, laminated one on the other in this order.

Note that the materials and thickness of the layers composing together the above magnetic tunnel junction layer 55 are not limited to the above ones but may be properly selected correspondingly to the purpose of use of the TMR element 27.

Figure 18:
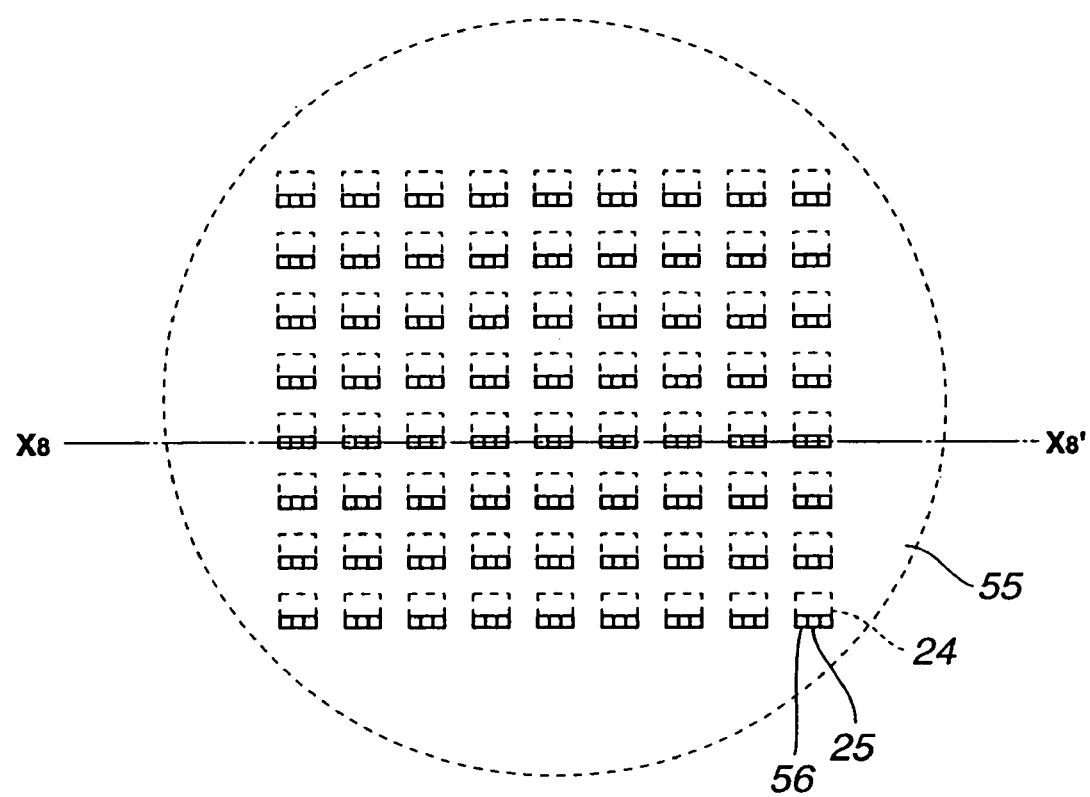
FIG. 18 is a schematic plan view of a second resist pattern formed on the magnetic tunnel junction layer in the process of head slider production.
Figure 19:
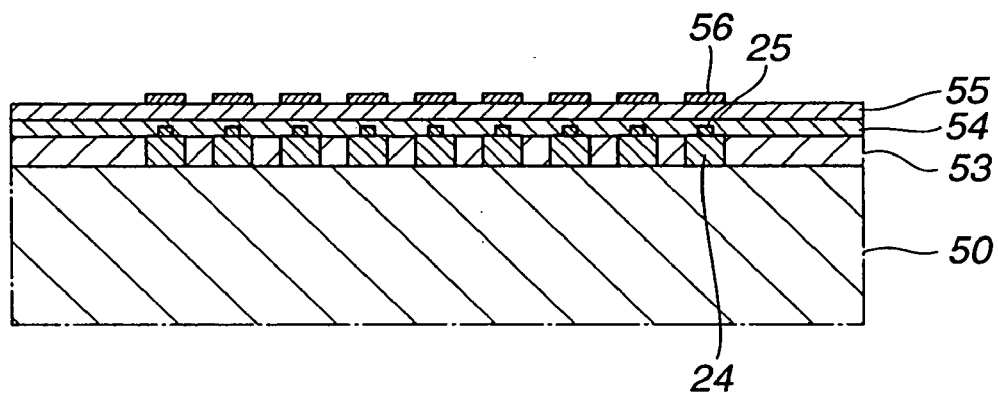
FIG. 19 is a schematic sectional view taken along the line $X_8$–$X_8'$ in FIG. 18.

Next, referring to FIGS. 18 and 19, there is illustrated a second resist pattern 56 formed on the magnetic tunnel junction layer 55 in the process of head slider production. FIG. 19 is a schematic plan view of the second resist pattern formed on the magnetic tunnel junction layer 55 and FIG. 19 is a schematic sectional view taken along the line $X_8$–$X_8'$ in FIG. 18. A photoresist is applied to the magnetic tunnel junction layer 55 and cured to form a resist layer. Then, the photolithography is utilized to pattern the resist layer to a predetermined form, thereby forming the second resist pattern 56 as shown.

Figure 20:
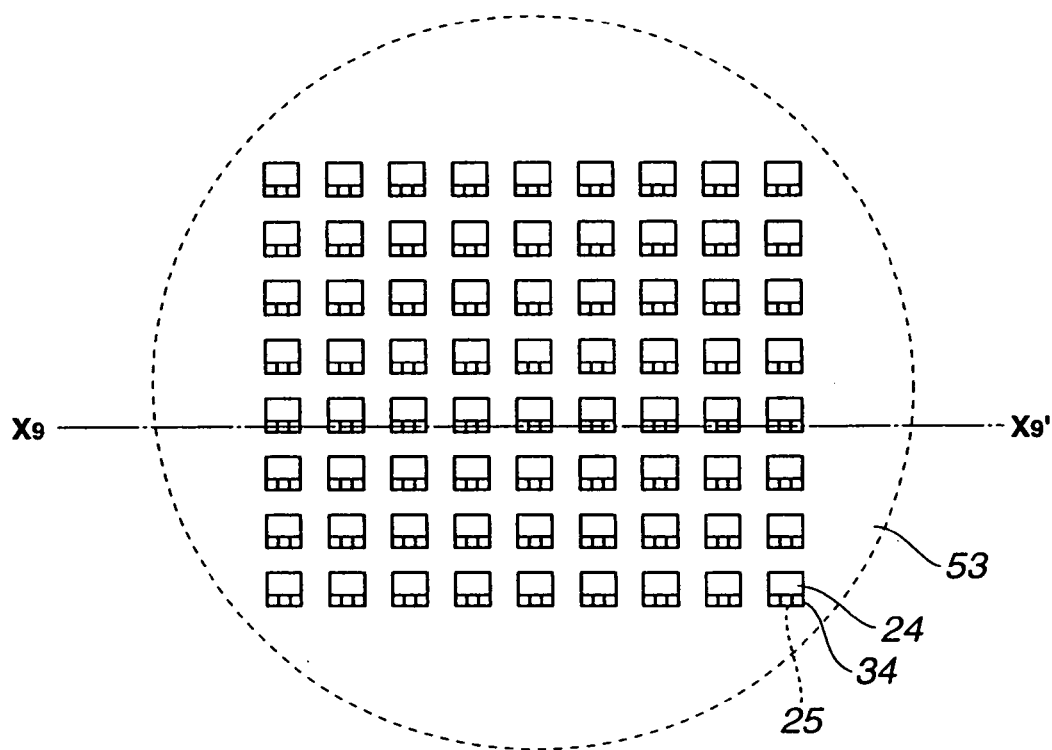
FIG. 20 is a schematic plan view of a lower nonmagnetic conductive layer and magnetic tunnel junction layer formed on the lower shielding layer in the process of head slider production
Figure 21:
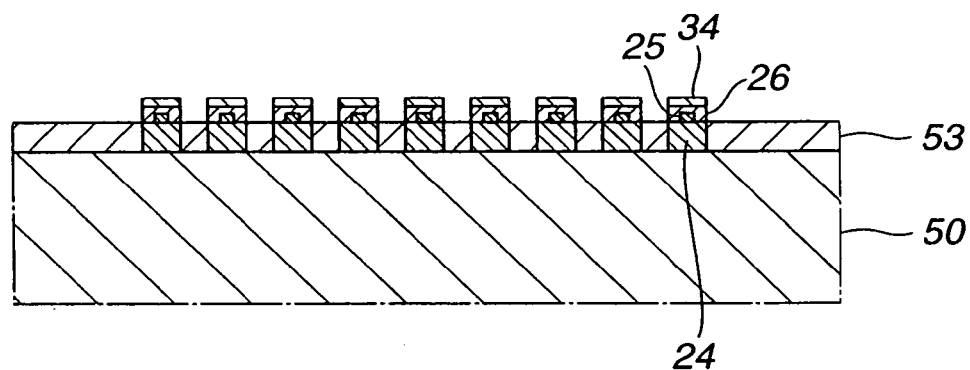
FIG. 21 is a schematic sectional view taken along the line $X_9$–$X_9'$ in FIG. 20.

Next, referring to FIGS. 20 and 21, there is illustrated the lower nonmagnetic conductive layer 26 and magnetic tunnel junction layer 34 formed on the lower shielding layer 24 in the process of head slider production. FIG. 20 is a schematic plan view of the lower nonmagnetic conductive layer 26 and magnetic tunnel junction layer 34 formed on the lower shielding layer 24 and FIG. 21 is a schematic sectional view taken along the line $X_9$–$X_9'$ in FIG. 20. As shown, the second resist pattern 56 is used as a mask to etch the magnetic tunnel junction layer 34 and first nonmagnetic conductive layer 54 and then the second resist pattern 56 is removed. Thus, there is formed on the lower shielding layer 24 the lower nonmagnetic conductive layer 26 and magnetic tunnel junction layer 34, having the predetermined form.

The magnetic tunnel junction layer 34 is formed right above the metal oxide layer which provides the aforementioned nonmagnetic nonconductive layer 25. That is, the metal oxide layer is polished, after formed, to a surface roughness of less than 0.2 nm in center line average height Ra by the CMP method, and the magnetic tunnel junction layer 34 is formed right above the metal oxide layer having the excellent smoothness.

Thus, with the magnetic tunnel junction layer 34, it is possible to avoid that the tunnel barrier layer 33 being very thin will be ruptured between the fixed- and free-magnetization layers 31 and 32 which will thus be put into electrical contact with each other, resulting in a decreased magnetoresistive coefficient of the TMR element 27.

Figure 22:
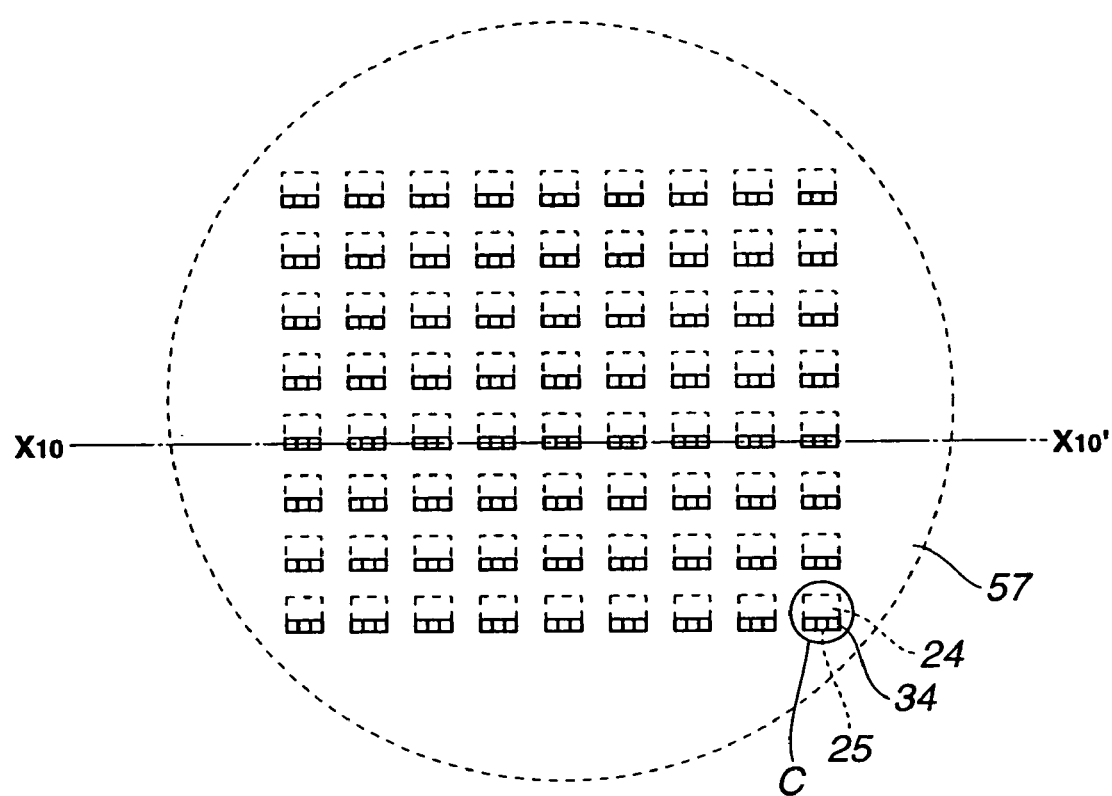
FIG. 22 is a schematic plan view of a second nonmagnetic nonconductive layer formed on the substrate and polished until the surface of the magnetic tunnel junction layer is exposed, in the process of head slider production.
Figure 23:
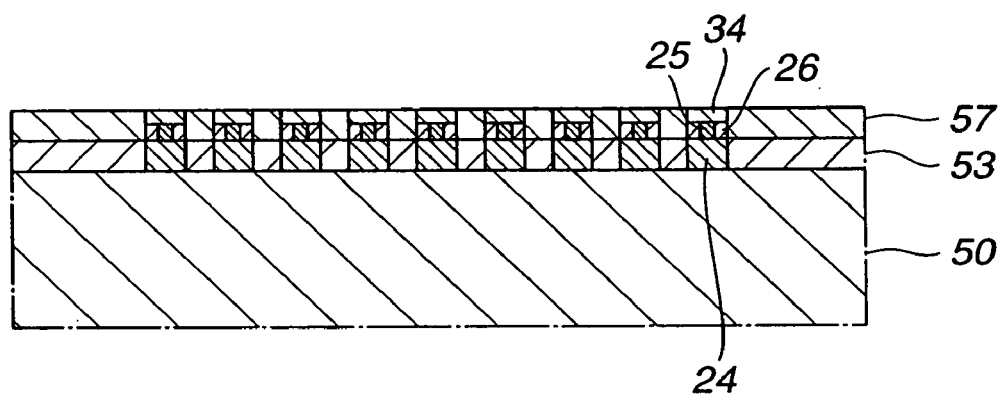
FIG. 23 is a schematic sectional view taken along the line $X_{10}$–$X_{10}'$ in FIG. 22.

Next, referring to FIGS. 22 and 23, there is illustrated a second nonmagnetic nonconductive layer 57 and magnetic tunnel junction layers 34 formed on the substrate 50 and polished until the surface of the magnetic tunnel junction layer 34 is exposed, in the process of head slider production. FIG. 22 is a schematic plan view of the second nonmagnetic nonconductive layer 57 and magnetic tunnel junction layers 34 formed on the substrate 50, and FIG. 23 is a schematic sectional view taken along the line $X_{10}$–$X_{10}'$ in FIG. 22. As shown, sputtering or the like is used to form the second nonmagnetic nonconductive layer 57 of $Al_2O_3$ for example over the substrate 50, and then the second magnetic nonconductive layer 57 is polished until the plurality of magnetic tunnel junction layers 34 formed on the substrate 50 is exposed. Thus, the second nonmagnetic nonconductive layer 57 is embedded between the substrate 50 and lower nonmagnetic conductive layer 26 and magnetic tunnel junction layers 34 to provide a flat surface where the lower nonmagnetic conductive layer 26 and magnetic tunnel junction layers 34 are not formed on the substrate 50.

Figure 24:
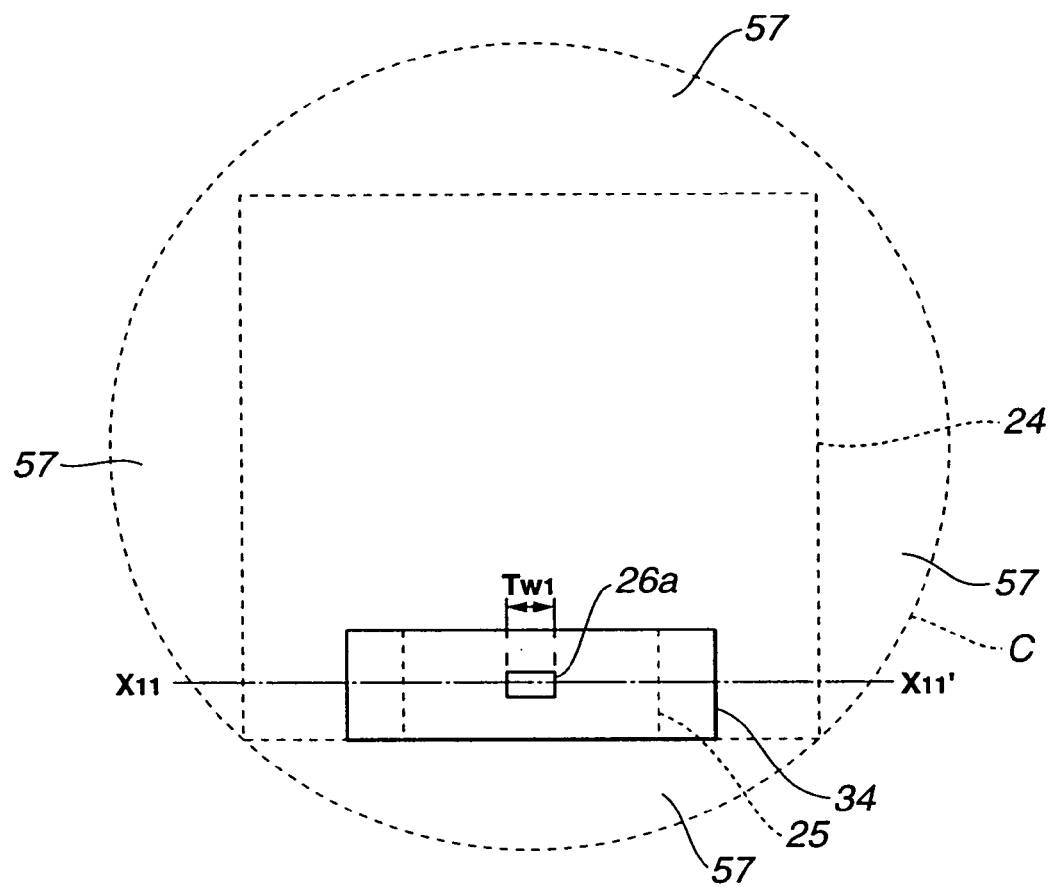
FIG. 24 is a schematic plan view of a recess formed around a portion of the magnetic tunnel junction layer which is to be a magnetic sensor of the TMR element in the process of head slider production.
Figure 25:
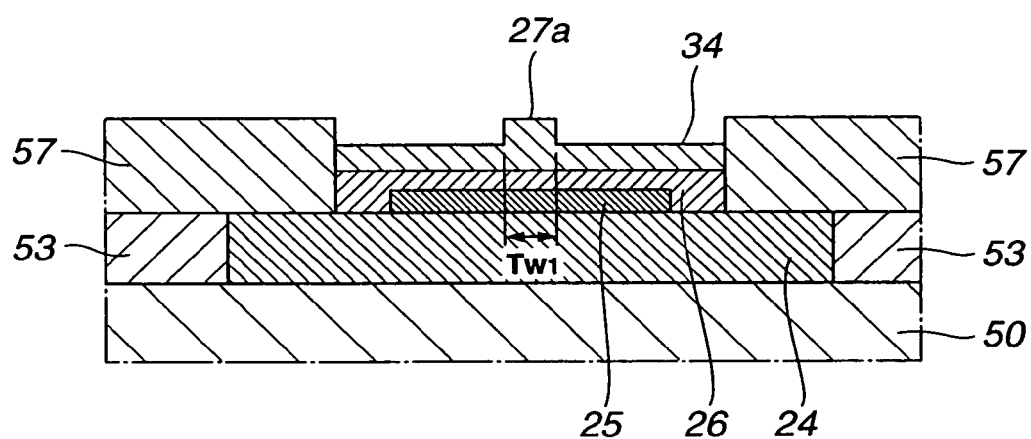
FIG. 25 is a schematic sectional view taken along the line $X_{11}$–$X_{11}'$ in FIG. 24.

Next, referring to FIGS. 24 and 25, there is illustrated a recess formed around a portion of the magnetic tunnel junction layer 34 which is to be the magnetic sensor 27a of the TMR element 27 in the process of head slider production. FIG. 24 is a schematic plan view, enlarged in scale, a portion C shown in FIG. 22, and FIG. 25 is a schematic sectional view taken along the line $X_{11}$–$X_{11}'$ in FIG. 24. As shown, a photoresist is applied to the flattened substrate 50 and cured to form a resist layer. The photolithography is utilized to pattern the resist layer to a predetermined form. Then, the patterned resist layer is used as a mask to etch, by ion etching, the magnetic tunnel junction layer 34 in a range from the free-magnetization layer 32 to the middle of the fixed-magnetization layer 31 except for a portion of the layer 34 which is to be the magnetic sensor 27a of the TMR element 27. Thereafter, the resist layer is removed from on the substrate 50. Thus, the track width $Tw_1$ of the TMR element 27 relative to the magnetic disc 3 is defined as shown in FIGS. 24 and 25. Note that the track width $Tw_1$ is about 5 μm in this embodiment but it is not limited to this value. The track width $Tw_1$ may be an appropriate value set according to the system requirement.

Figure 26:
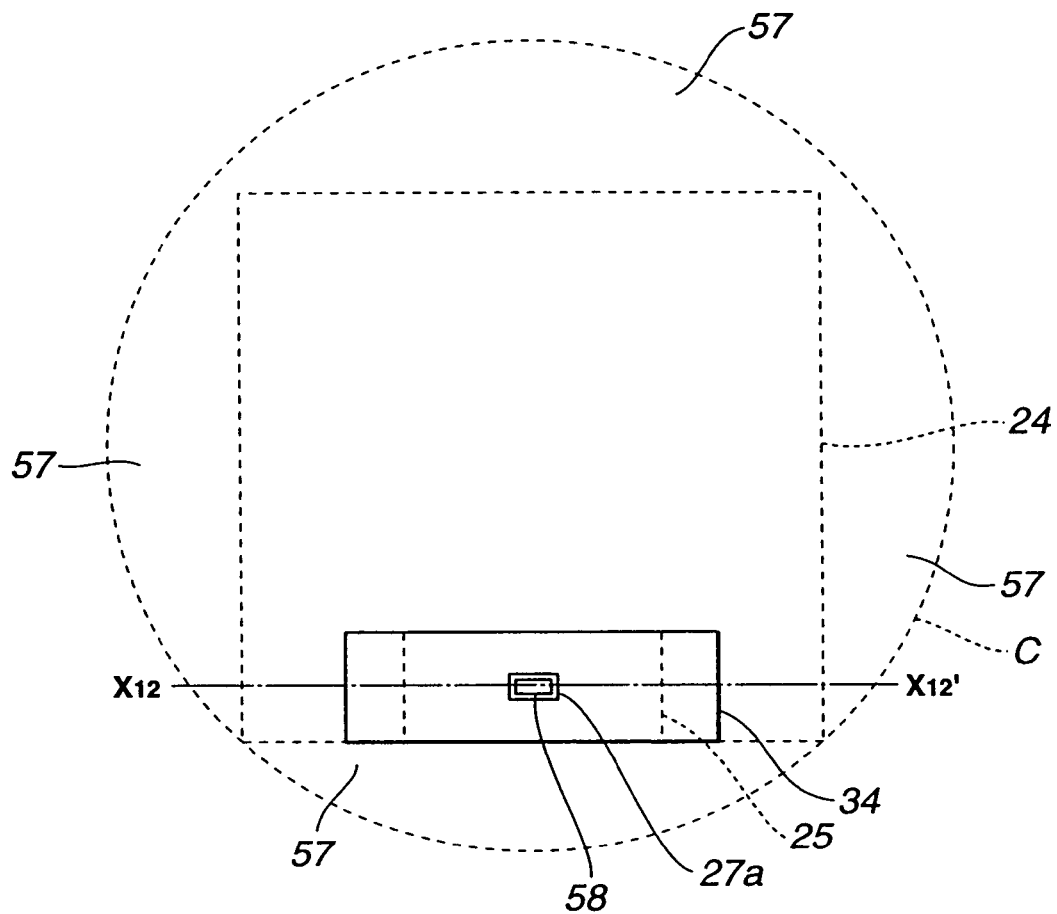
FIG. 26 is a schematic plan view of a third resist pattern formed right above the magnetic sensor of the TMR element in the process of head slider production.
Figure 27:
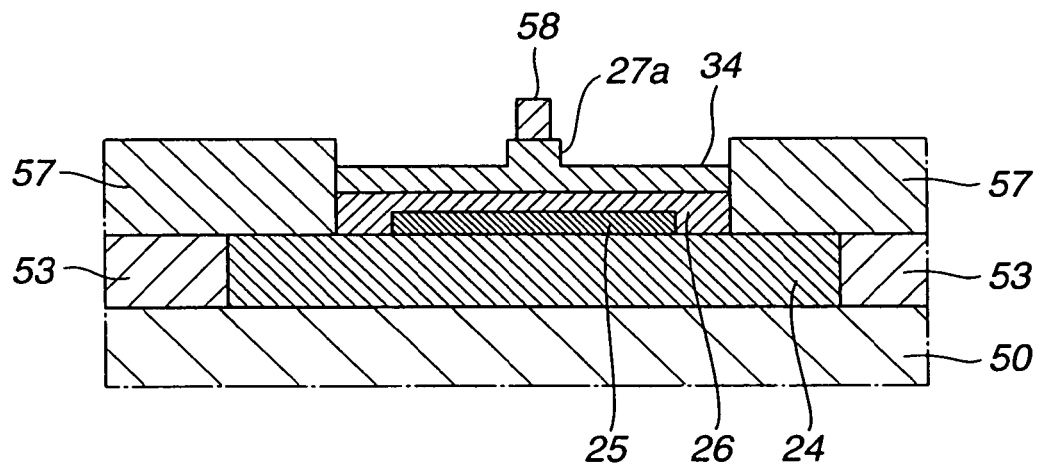
FIG. 27 is a schematic sectional view taken along the line $X_{12}$–$X_{12}'$ in FIG. 26.

Next, referring to FIGS. 26 and 27, there is illustrated a third resist pattern 58 formed right above the magnetic sensor 27a of the TMR element 27 in the process of head slider production. FIG. 26 is a schematic plan view, enlarged in scale, of the portion C in FIG. 22, and FIG. 27 is a schematic sectional view taken along the line $X_{12}$–$X_{12}'$ in FIG. 26. A photoresist is applied to the substrate 50 and cured to form a resist layer. The photolithography is utilized to pattern the resist layer to a predetermined form, thereby forming the third resist pattern 58 right above the magnetic sensor 27a of the TMR element 27 as shown in FIGS. 26 and 27.

Figure 28:
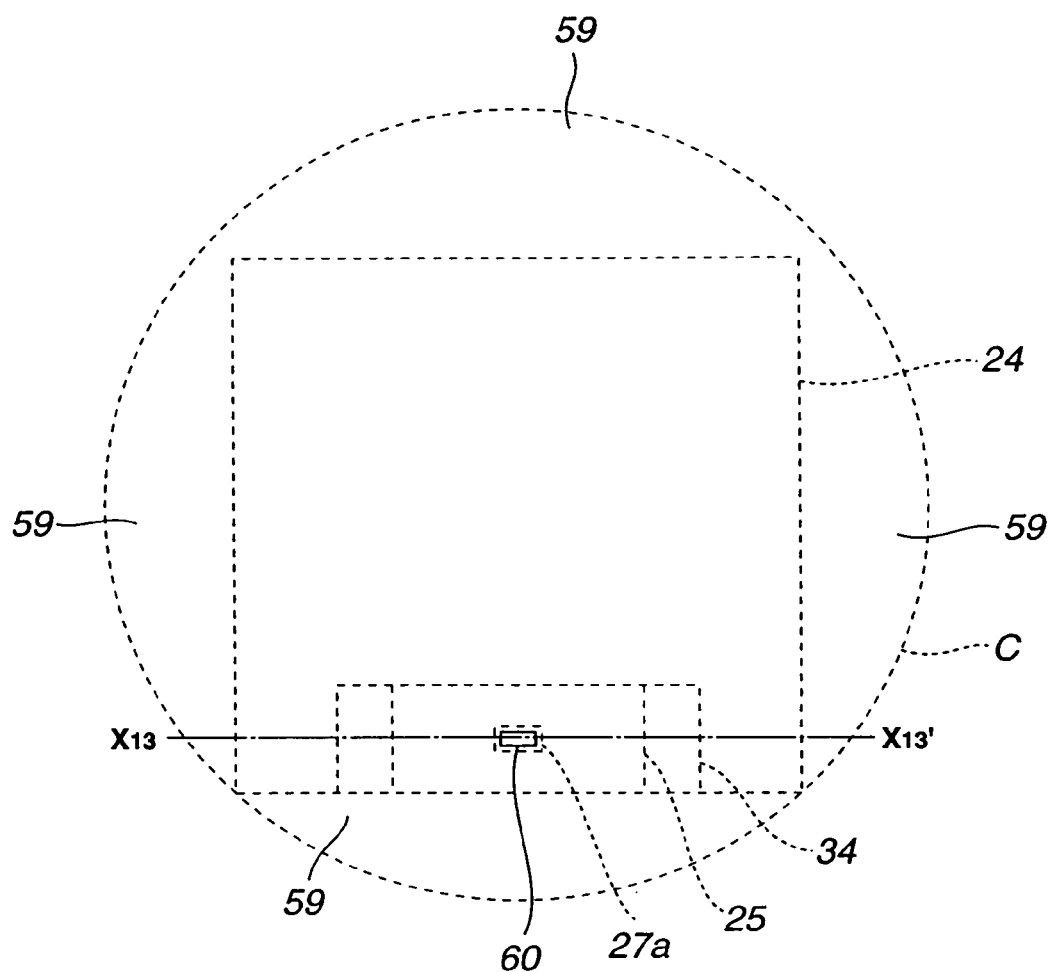
FIG. 28 is a schematic plan view of a third nonmagnetic nonconductive layer having a contact hole, formed right above the magnetic sensor of the TMR element in the process of head slider production.
Figure 29:
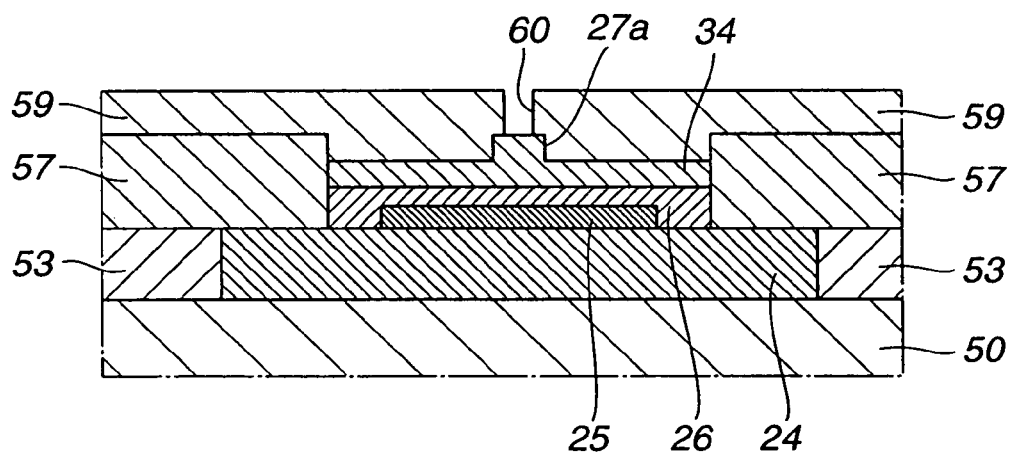
FIG. 29 is a schematic sectional view taken along the line $X_{13}$–$X_{13}'$ in FIG. 28.

Next, referring to FIGS. 28 and 29, there is illustrated a third nonmagnetic nonconductive layer 59 having a contact hole, formed right above the magnetic sensor 27a of the TMR element 27 in the process of head slider production. FIG. 28 is a schematic plan view, enlarged in scale, of the portion C shown in FIG. 22 and FIG. 29 is a schematic sectional view taken along the line $X_{13}$–$X_{13}'$ in FIG. 28. The third resist pattern 58 is used to form, by sputtering or the like, a third nonmagnetic nonconductive layer 59 of $Al_2O_3$ for example, and then the third resist pattern 58 is removed along with the third nonmagnetic nonconductive layer 59 on the third resist layer 58, whereby there is formed the third nonmagnetic nonconductive layer 59 having a contact hole 60 open right above the magnetic sensor 27a of the TMR element 27.

Figure 30:
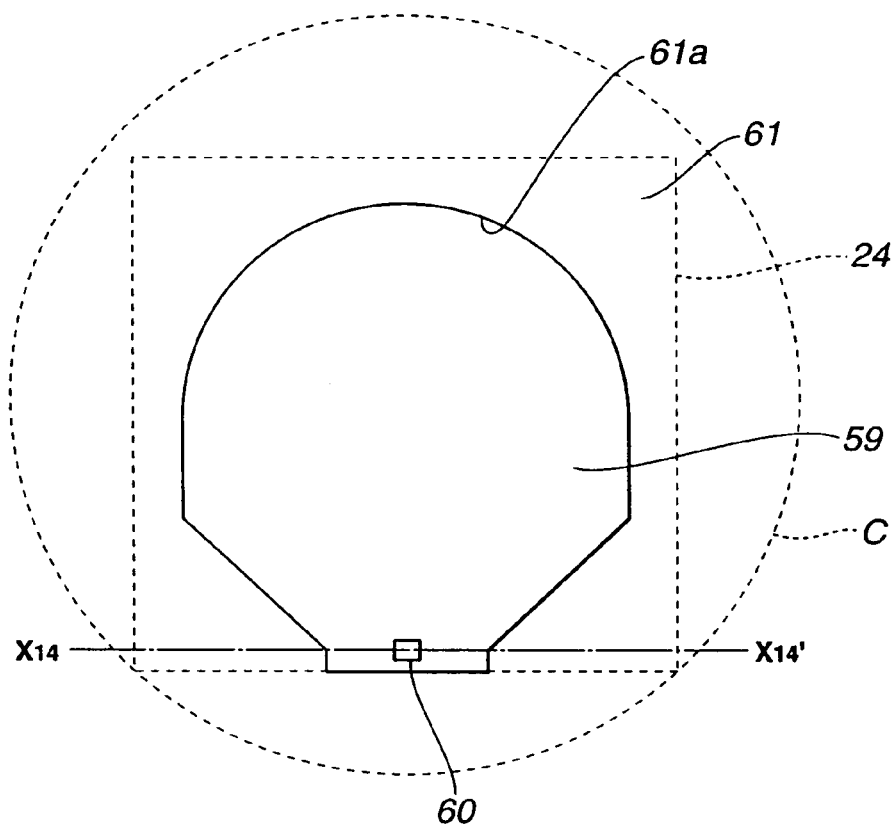
FIG. 30 is a schematic plan view of a fourth resist pattern formed on the third nonmagnetic nonconductive layer in the process of head slider production.
Figure 31:
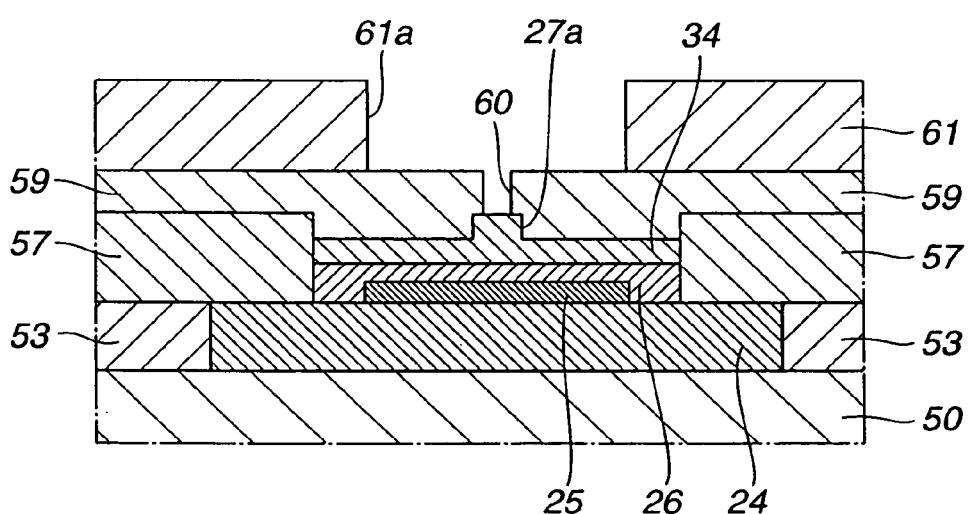
FIG. 31 is a schematic sectional view taken along the line $X_{14}$–$X_{14}'$ in FIG. 30.

Next, referring to FIGS. 30 and 31, there is illustrated a fourth resist pattern formed on the third nonmagnetic nonconductive layer 59 in the process of head slider production. FIG. 30 is a schematic plan view, enlarged in scale of the portion C shown in FIG. 22, and FIG. 31 is a schematic sectional view taken along the line $X_{14}$–$X_{14}'$ in FIG. 30. As shown, a photoresist is applied to the third nonmagnetic nonconductive layer 59 and cured to form a resist layer. The photolithography is utilized to pattern the resist layer to a predetermined form, thereby forming a fourth resist pattern 61 having an opening 61a having a predetermined form as shown in FIGS. 31 and 32.

Figure 32:
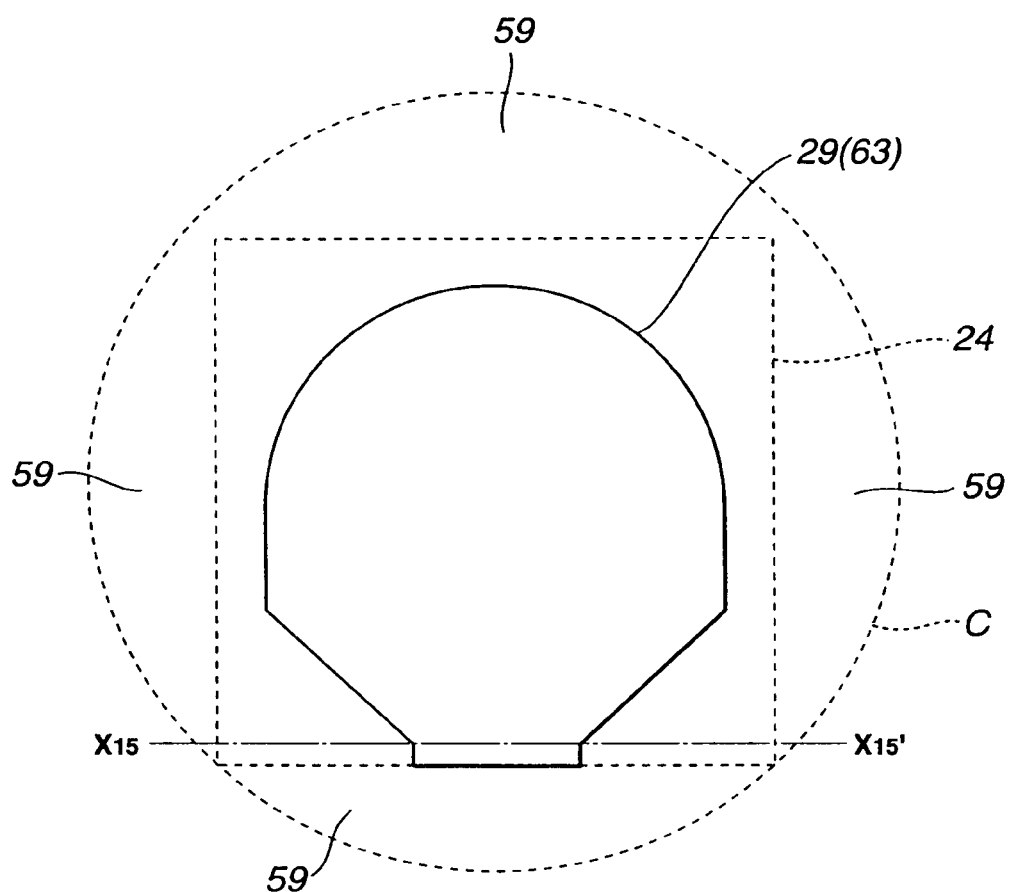
FIG. 32 is a schematic plan view of an upper nonmagnetic conductive layer and upper shielding layer formed on the third nonmagnetic conductive layer in the process of head slider production.
Figure 33:
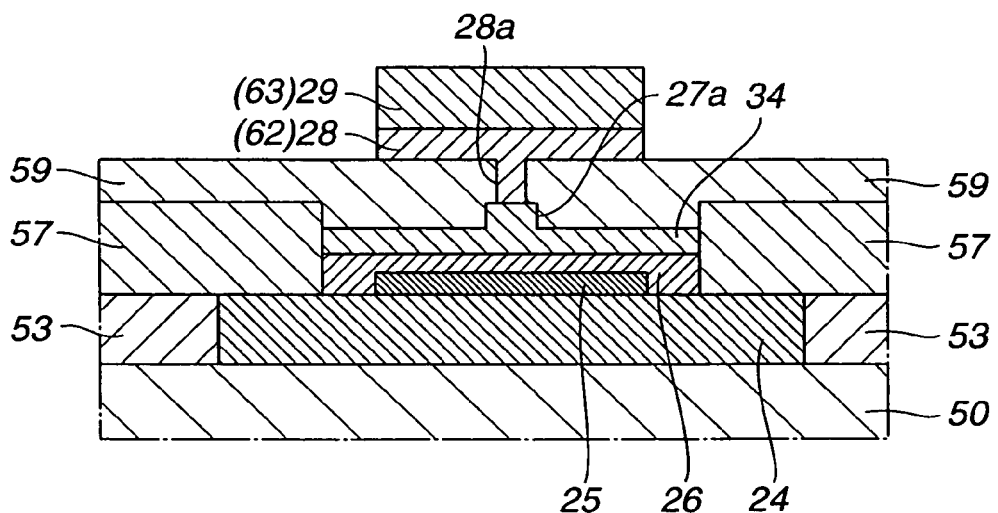
FIG. 33 is a schematic sectional view taken along the line $X_{15}$–$X_{15}'$ in FIG. 32.

Next, referring to FIGS. 32 and 33, there is illustrated an upper nonmagnetic conductive layer 28 and upper shielding layer 29 formed on the third nonmagnetic nonconductive layer 59 in the process of head slider production. FIG. 32 is a schematic plan view, enlarged in scale, of the portion C shown in FIG. 22, and FIG. 33 is a schematic sectional view taken along the line $X_{15}$–$X_{15}'$ in FIG. 32. As shown, the fourth resist pattern 61 is used to form, by sputtering or the like, a second nonmagnetic conductive layer 62 which is to be the upper nonmagnetic conductive layer 28. At this time, the second nonmagnetic conductive layer 62 will be embedded in the contact hole 60 in the third nonmagnetic nonconductive layer 59. Thus, there is formed the projection 28a of the upper nonmagnetic conductive layer 28, which is to abut the magnetic sensor 27a of the TMR element 27. The second nonmagnetic conductive layer 62 should preferably be formed from Cu or the like. Note that the second nonmagnetic conductive layer 62 may have an appropriate thickness set correspondingly to the frequency etc. of a signal recorded in a magnetic recording medium.

Then, sputtering or the like is used to form, on the second nonmagnetic conductive layer 62, the upper shielding layer 29 and a second soft magnetic conductive layer 63 which provides the lower core layer 29. The second soft magnetic conductive layer 63 is formed from an amorphous lamination layer of CoZrNbTa of 2.3 μm for example. Note that the second soft magnetic conductive layer 63 may be formed from other than the amorphous lamination layer and it may be formed by the use of any other method than the sputtering such as plating or evaporation for example.

Then, the fourth resist pattern 61 is removed along with the second nonmagnetic conductive layer 62 and second soft magnetic conductive layer 63 formed on the fourth resist pattern 61. Thus, there are formed on the third nonmagnetic nonconductive layer 59 the upper nonmagnetic conductive layer 28 and upper shielding layer 29.

Figure 34:
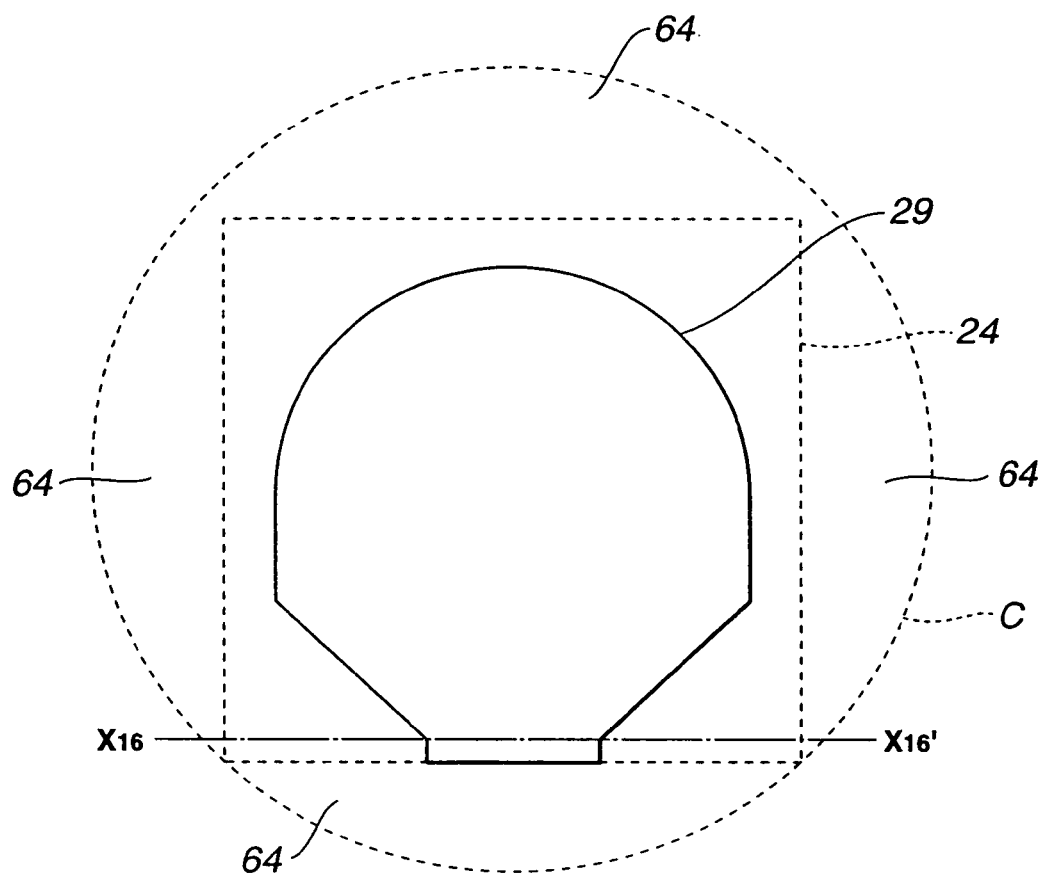
FIG. 34 is a schematic plan view of a fourth nonmagnetic nonconductive layer formed on the substrate and polished until the surface of the upper shielding layer is exposed, in the process of head slider production.
Figure 35:
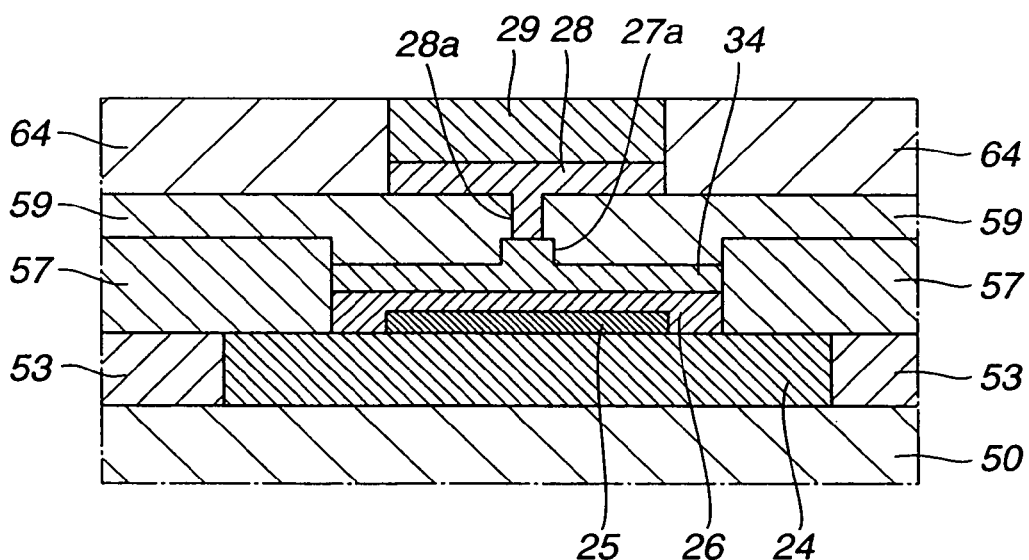
FIG. 35 is a schematic sectional view taken along the line $X_{16}$–$X_{16}'$ in FIG. 34.

Next, referring to FIGS. 34 and 35, there is illustrated a fourth nonmagnetic nonconductive layer 64 formed on the substrate 50 and polished until the surface of the upper shielding layer 29 is exposed, in the process of head slider production. FIG. 34 is a schematic plan view, enlarged in scale, of the portion C shown in FIG. 22, and FIG. 35 is a schematic sectional view taken along the line $X_{16}$–$X_{16}'$ in FIG. 34. The fourth nonmagnetic nonconductive layer 64 of $Al_2O_3$ for example is formed by sputtering or the like over the substrate 50, and then polished until the plurality of upper shielding layers 29 formed on the substrate 50 is exposed. Thus, the fourth nonmagnetic nonconductive layer 64 is embedded between the substrate 50 and upper shielding layers 29 to provide a flat surface where the upper shielding layers 29 are not formed on the substrate 50.

Figure 36:
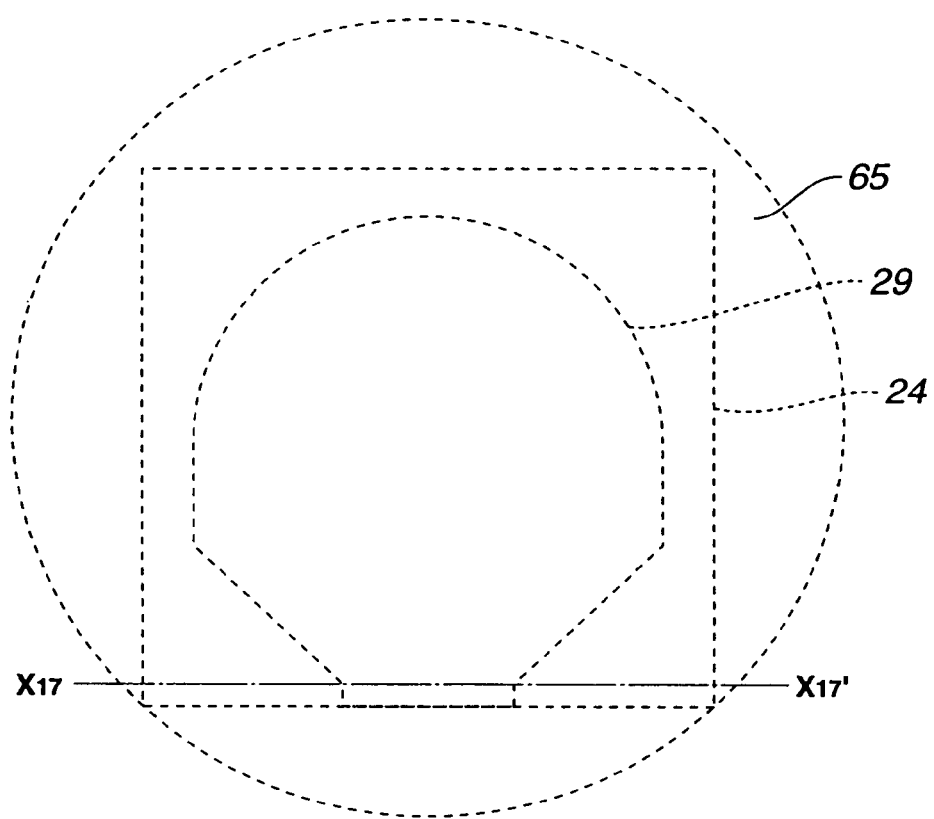
FIG. 36 is a schematic plan view of a fifth nonmagnetic nonconductive layer formed on the flattened substrate in the process of head slider production.
Figure 37:
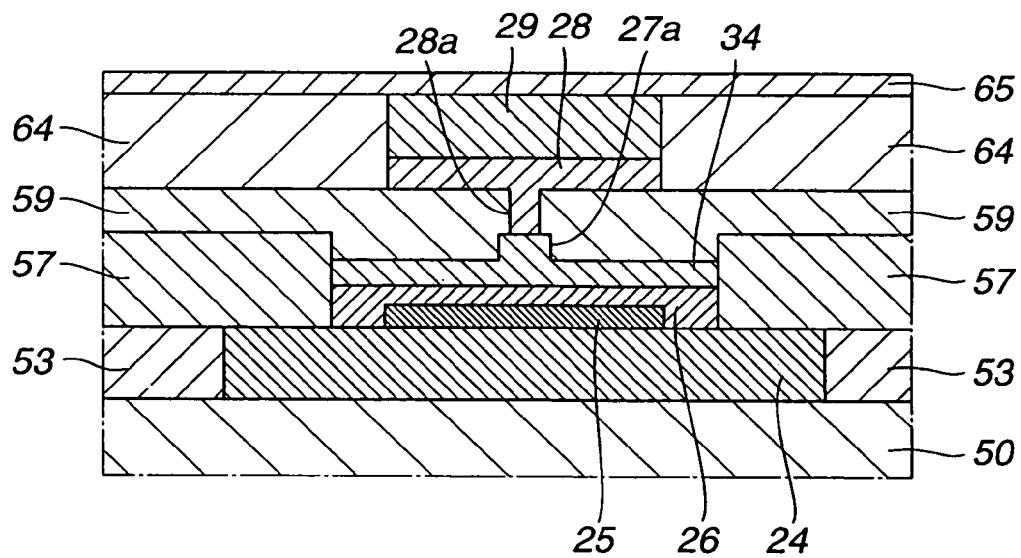
FIG. 37 is a schematic sectional view taken along the line $X_{17}$–$X_{17}'$ in FIG. 36.

Next, referring to FIGS. 36 and 37, there is illustrated a fifth nonmagnetic nonconductive layer 65 formed on the flattened substrate 50 in the process of head slider production. FIG. 36 is a schematic plan view, enlarged in scale, of the portion C shown in FIG. 22, and FIG. 37 is a schematic sectional view taken along the line $X_{17}$–$X_{17}'$ in FIG. 36. As shown, the fifth nonmagnetic nonconductive layer 65 which is to be the magnetic gap 37 is formed by sputtering or the like on the flattened substrate 50. The fifth nonmagnetic nonconductive layer 65 should preferably be formed from $Al_2O_3$ or the like.

Figure 38:
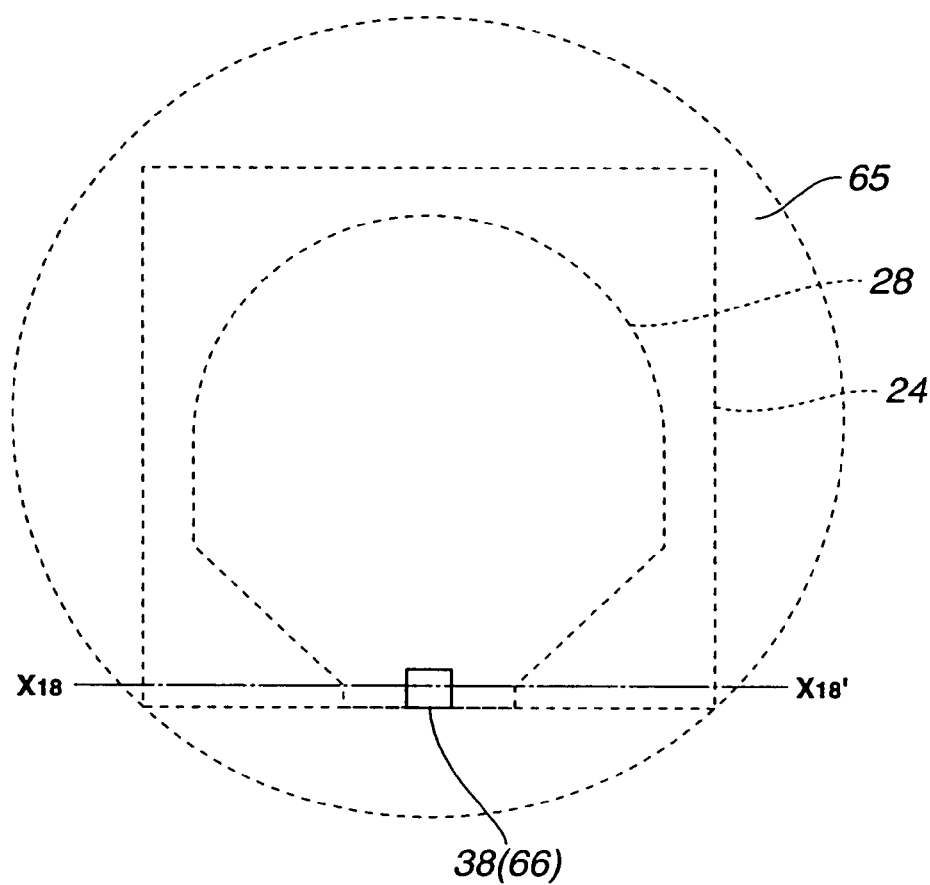
FIG. 38 is a schematic plan view of an upper core layer formed on the fifth nonmagnetic nonconductive layer in the process of head slider production.
Figure 39:
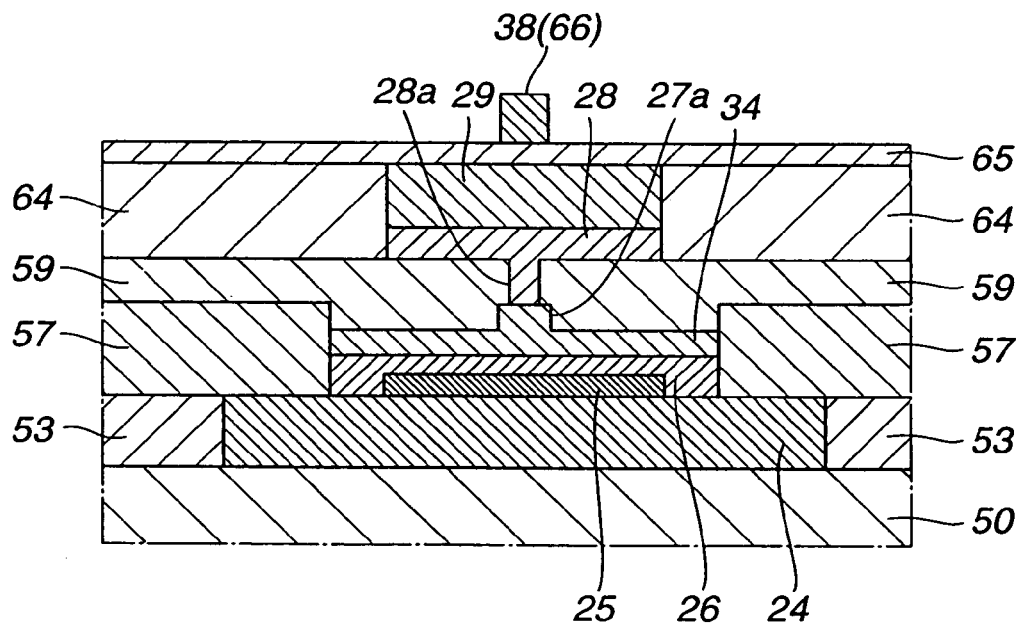
FIG. 39 is a schematic sectional view taken along the line $X_{18}$–$X_{18}'$ in FIG. 38.

Next, referring to FIGS. 38 and 39, there is illustrated the upper core layer 38 formed on the fifth nonmagnetic nonconductive layer 65 in the process of head slider production. FIG. 38 is a schematic plan view, enlarged in scale, of the portion C shown in FIG. 22, and FIG. 39 is a schematic sectional view taken along the line $X_{18}$–$X_{18}'$ in FIG. 38. As shown, a photoresist is applied to the firth nonmagnetic nonconductive layer 65 and cured to form a resist layer. The photolithography is utilized to pattern the resist layer to a predetermined form. The patterned resist layer is used to form a third soft magnetic layer 66 by sputtering or the like from an amorphous lamination layer for example, and then the resist layer is removed along with the third soft magnetic layer 66 formed on the resist layer. Thus, the upper core layer 38 having a predetermined width is formed on the fifth nonmagnetic nonconductive layer 65. Also, the fifth nonmagnetic nonconductive layer 65 is disposed opposite to the upper core layer 38 with the fifth nonmagnetic nonconductive layer 65 being laid between them to define the magnetic gap 37 whose width is a track width $Tw_2$. Note that the track width $Tw_2$ may be an appropriate value set correspondingly to the system requirement.

Figure 40:
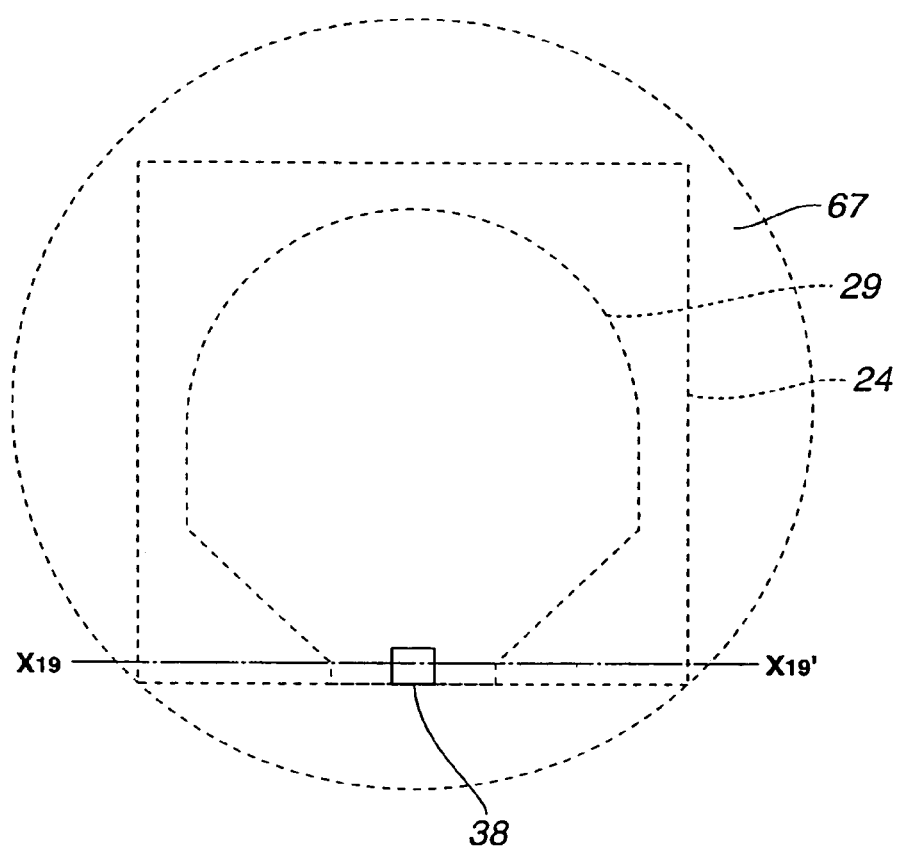
FIG. 40 is a schematic plan view of a sixth nonmagnetic nonconductive layer formed on the substrate and polished until the surface of the upper core layer is exposed, in the process of head slider production.
Figure 41:
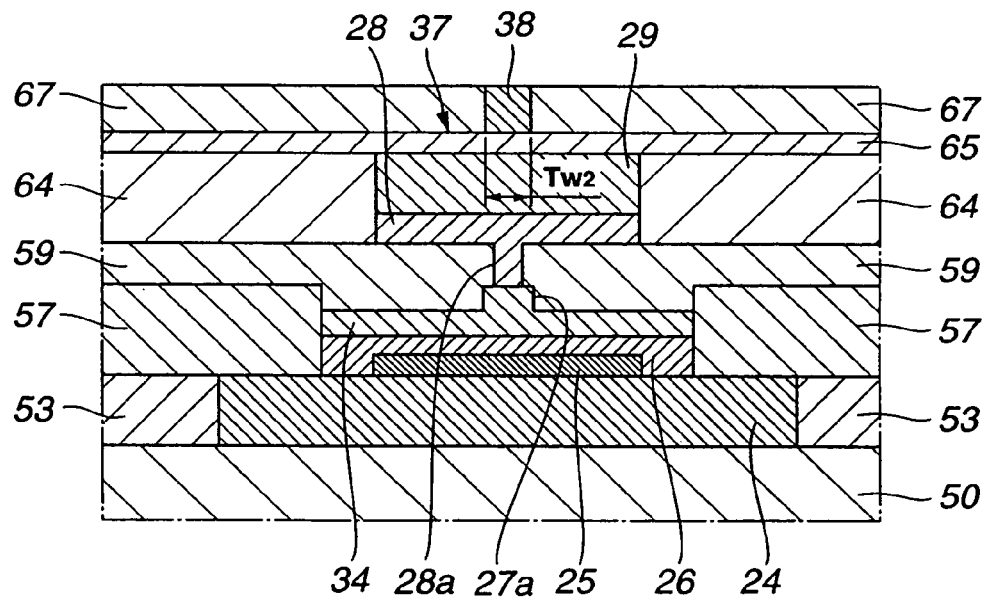
FIG. 41 is a schematic sectional view taken along the line $X_{19}$–$X_{19}'$ in FIG. 40.

Next, referring to FIGS. 40 and 41, there is illustrated a sixth nonmagnetic nonconductive layer 67 formed on the substrate 50 and polished until the surface of the upper core layer is exposed, in the process of head slider production. FIG. 40 is a schematic plan view, enlarged in scale, of the portion C shown in FIG. 22, and FIG. 41 is a schematic sectional view taken along the line $X_{19}$–$X_{19}'$ in FIG. 40. The sixth nonmagnetic nonconductive layer 67 of $Al_2O_3$ for example is formed by sputtering or the like over the substrate 50, and then polished until the plurality of upper core layers 38 formed on the substrate 50 is exposed. Thus, the sixth nonmagnetic nonconductive layer 67 is embedded between the substrate 50 and upper core layers 38 to provide a flat surface where no upper core layers 38 are formed on the substrate 50.

Figure 42:
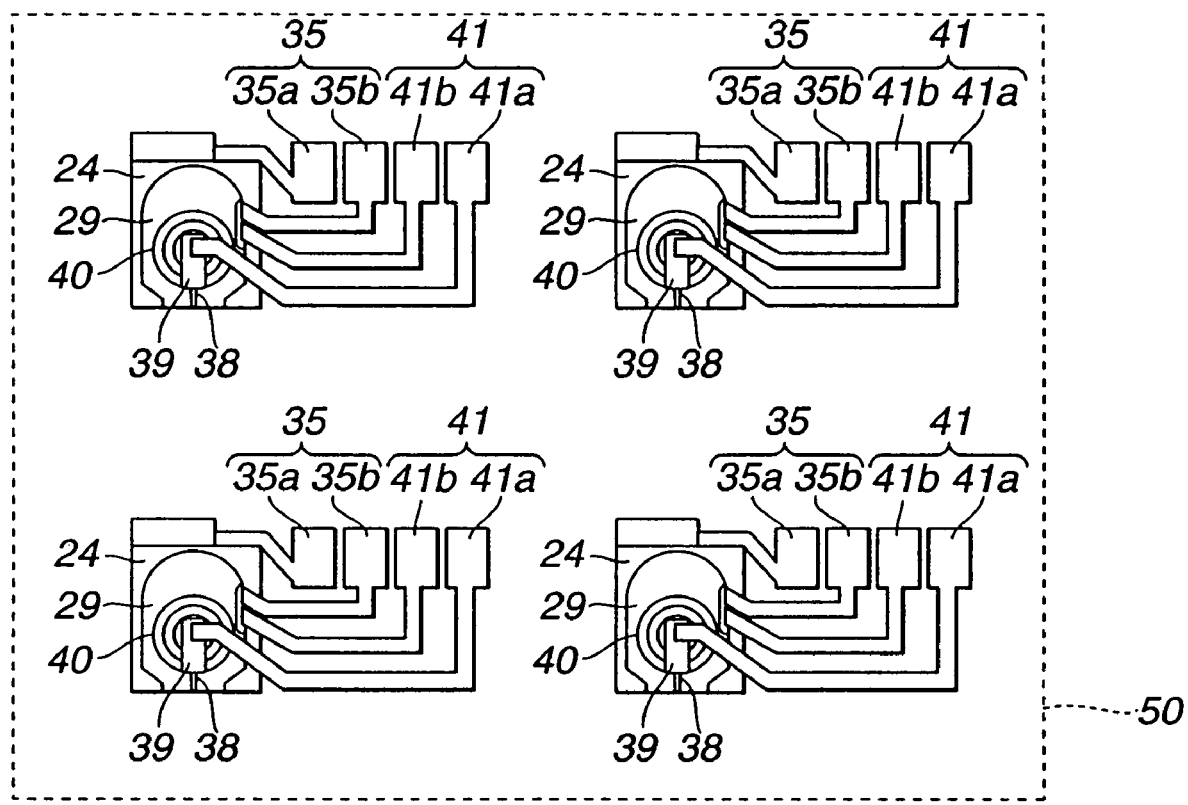
FIG. 42 is a schematic plan view of thin-film coils, back yokes and lead wires formed on the flattened substrate in the process of head slider production.

Next, the thin-film coils 40, back yokes 39 and lead wires 35 and 41 are formed on the flattened substrate 50 as shown in FIG. 42.

The thin-film coil 40 is spirally formed by sputtering around a portion where the lower core layer 29 and back yoke 39 abut each other, and a nonmagnetic nonconductive layer is formed to cover the thin-film coil 40. The thin-film coil 40 is formed from a conductive material such as Cu.

The back yoke 39 is formed in junction with the upper core layer 38 while abutting the lower core layer 29 at a generally central portion of them spirally formed thin-film col 40. Thus, the lower core layer 38, lower core layer 29 and back yoke 39 will form together the inductive type thin-film head 22.

As the lead wires 35 and 41, there are formed the lead wires 35a and 35b which are to electrically be connected to the lower and upper shielding layers 24 and 29, respectively, and the lead wires 41a and 41b which are to electrically be connected to the inner and outer circumferential ends, respectively, of the thin-film coil 40. More particularly, the photolithography is utilized to pattern a photoresist to a predetermined form. Etching is effected using the photoresist as a mask to form the lower and upper shielding layers 24 and 29, and a terminal recess in which a portion abutting the inner and outer circumferential ends of the thin-film coil 40 is exposed. A conductive layer of Cu having a thickness of about 6 μm is formed by electroplating using a copper sulfate solution for example, and then the photoresist is removed along with the conductive layer formed on the photoresist. Thus, the lower and upper shielding layers 24 and 29, inner and outer circumferential ends of the thin-film coil 40, and the conductive layer embedded in the terminal recess are electrically connected to each other. Then, a conductive layer of Cu having a predetermined form is formed by electroplating using a copper sulfate solution so as to be joined to the conductive layer embedded in the terminal recess. Thus, the lead wires 35a, 35b, 41a and 41b are formed as shown in FIG. 42. Note that the conductive layer may be formed by a method other than the electroplating so long as it will not adversely affect the other layers.

Figure 43:
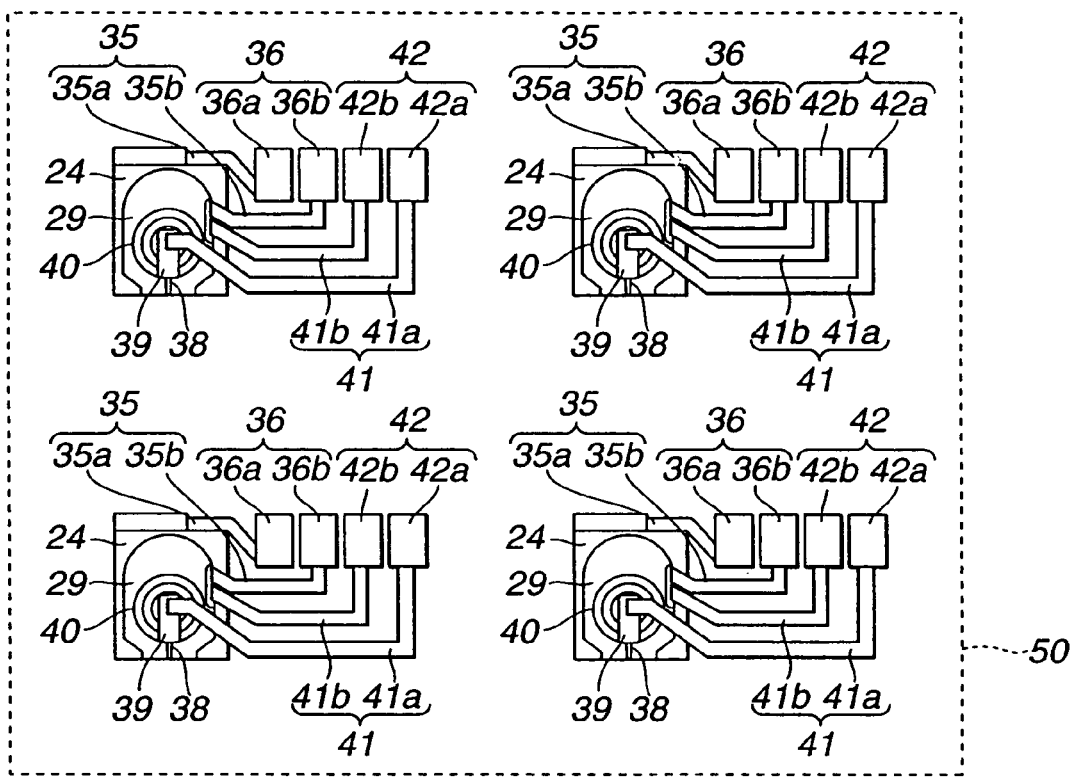
FIG. 43 is a schematic plan view of external connection terminals formed on the ends of the lead wires in the process of head slider production.

Next, the external connection terminals 36 and 42 are formed on the ends of the lead wires 35 and 41, respectively, as shown in FIG. 43. As the external connection terminals 36 and 42, there are formed the external connection terminals 36a and 36b which are to electrically be connected to the lead wires 35a and 35b, respectively, and the external connection terminals 42a and 42b which are to electrically be connected to the lead wires 41a and 41b, respectively. More particularly, the photolithography is utilized to pattern a photoresist to a predetermined form. The patterned photoresist is used to form a conductive layer of Au by sputtering, electroplating or the like for example, and the photoresist is removed along with the conductive layer formed on the photoresist. Thus, there will be formed the external connection terminals 36a, 36b, 42a and 42b as shown in FIG. 43.

Figure 44:
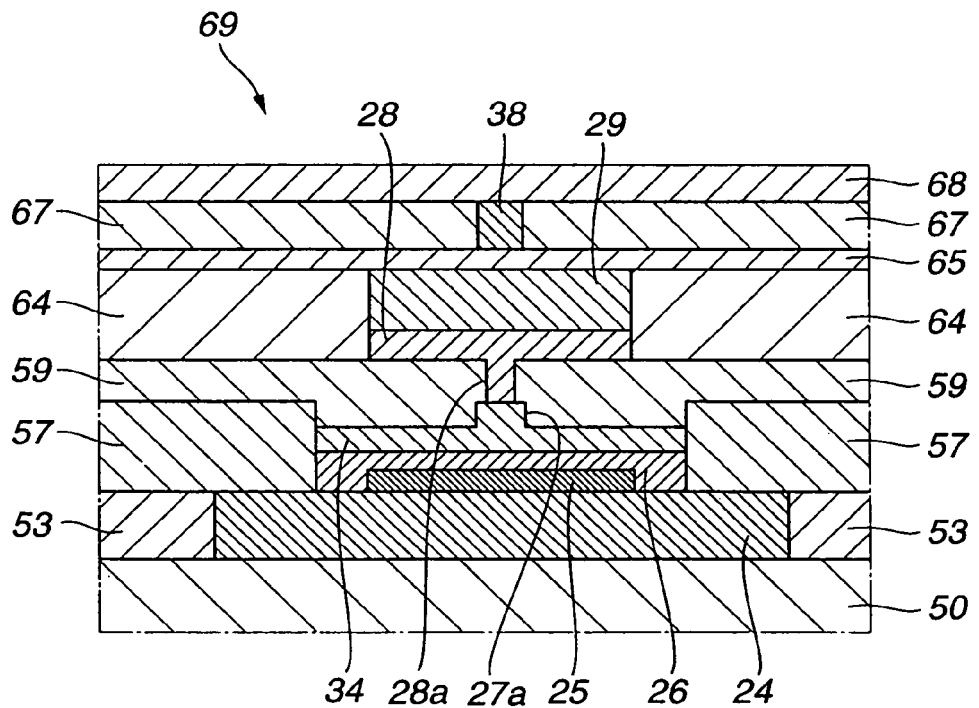
FIG. 44 is a schematic sectional view of a protective layer formed on the substrate and polished until the surface of the external connection terminal is exposed, in the process of head slider production.

Next, a protective layer 68 of $Al_2O_3$ for example is formed, as shown in FIG. 44, by sputtering or the like over the substrate 50, and then polished until the external connection terminals 36 and 42 formed on the substrate 50 are exposed. More specifically, the protective layer 68 is formed from $Al_2O_3$ for example by sputtering to a thickness of about 4 μm. Note that the protective layer 68 can be formed from other than $Al_2O_3$ so long as this material is nonmagnetic and nonconductive. Taking the hostile-environment property and abrasion resistance in consideration, the protective layer 68 should preferably be formed from $Al_2O_3$. Also, to form the protective layer 68, the evaporation process for example may be adopted instead of the sputtering. The external connection terminals 36 and 42 are polished until their surfaces are exposed. In this polishing, for example abrasive grains of diamond of about 2 μm in grain size are used to polish the external connection terminals 36 and 42 until their surfaces are exposed. Then, the surfaces are buffed with silicon abrasive grains for mirror-finish of the surfaces. Thus, there can be obtained the substrate 50 having formed thereon a plurality of head elements 69 which will eventually be the magnetic head 20.

Figure 45:
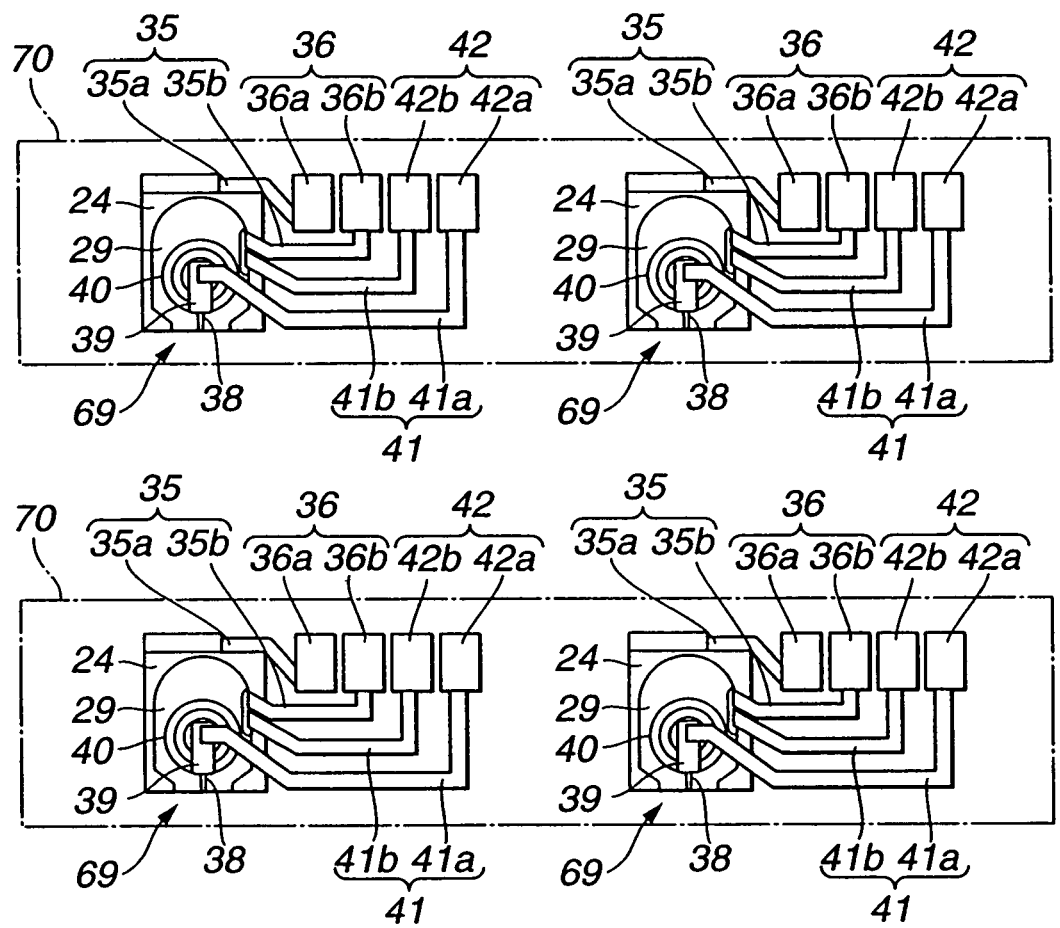
FIG. 45 is a schematic plan view of a plurality of bar-like head blocks formed by cutting the substrate into stripe shapes in the process of head slider production.

Next, the substrate 50 having the plurality of head elements 69 formed thereon is cut into strips as shown in FIG. 45 to provide bar-like head blocks 70 in which there are arranged side-by-side the head elements 69 which are to be the magnetic heads 20.

Figure 46:
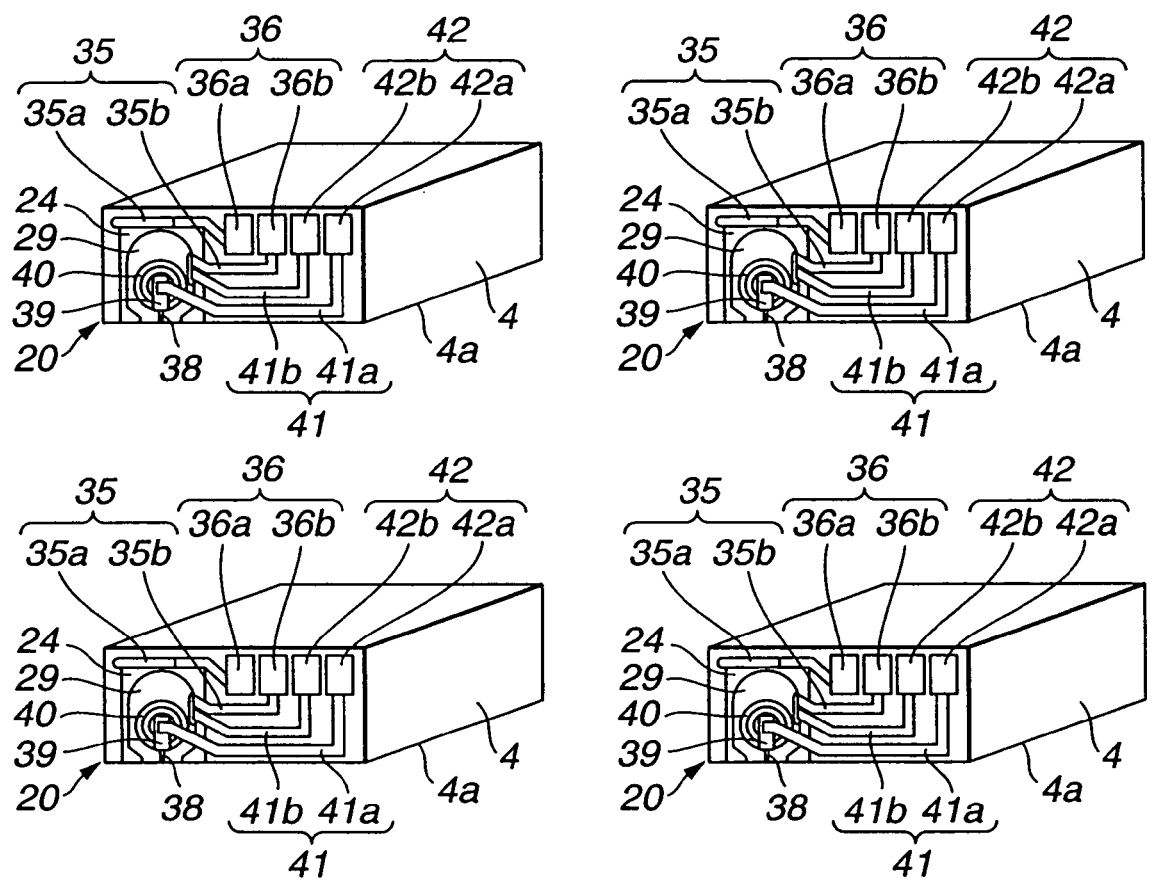
FIG. 46 is a schematic perspective view of a plurality of head sliders produced by splitting the head block into individual head chips in the process of head slider production.

Next, the surface of the head block 70 is polished on a surface plate to adjusts the height of the head element 69, and recessed and tapered to form the airborne surface (ABS) of the head slider 4, and then is divided into individual head chips. Thus, there is produced a plurality of head sliders 4 on each of which the magnetic head 20 as shown in FIG. 46 is to be installed.

For use of the head slider 4 produced as in the foregoing, the head slider 4 is mounted on the free end of the suspension 12, and wiring terminals provided on the suspension 12 are electrically connected to the external connection terminals 36 and 42 of the magnetic head 20 with conductor of gold (Au) by wire bonding or the like. Thus, the magnetic head 20 can be put into contact with an external circuit. The head slider 4 will be installed to a hard disc drive as shown in FIG. 1 while being mounted on the suspension 12.

As in the above, the method according to the present invention forms the magnetic metal layer having a good surface roughness and forming the nonmagnetic nonconductive layer 25 on the first soft magnetic conductive layer 51 which provides the lower shielding layer 24, and then forms the magnetic tunnel junction layer 34 which provides the TMR element 27 right above the metal oxide layer having the good surface roughness. Thus, according to the present invention, it is possible to prevent the magneto-resistive coefficient of the TMR element 27 from falling and thus easily produce a high-yield, high-quality TMR head.

Figure 47:
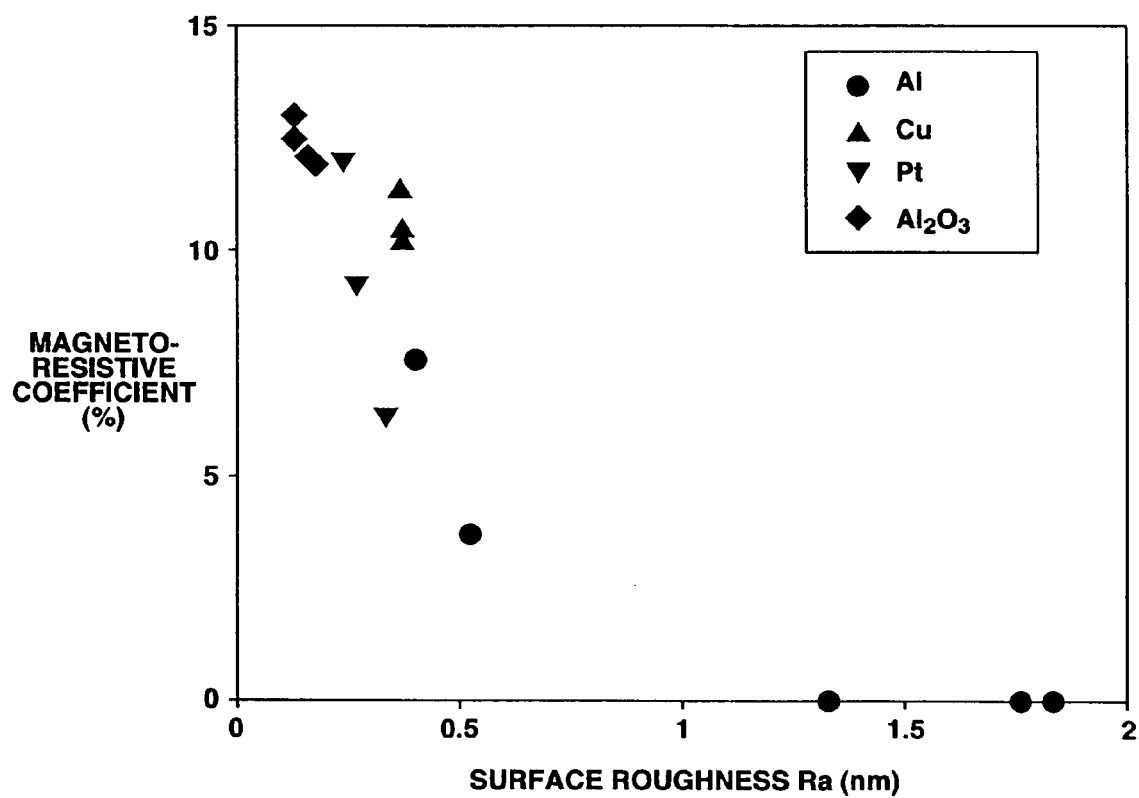
FIG. 47 shows a relation between surface roughness and magneto-resistive coefficient.

In this embodiment, the metal oxide layer for the nonmagnetic nonconductive layer 25 is formed from alumina layer ($Al_2O_3$). In addition to the alumina layer, each of Al layer, Cu layer and Pt layer was experimentally formed beneath the TMR element 27, and then the relation between the surface roughness (will be referred to as "center line average height Ra" hereinunder) of the layer after being polished chemically and mechanically (CMP) and the magneto-resistive coefficient of the TMR element 27 was measured. The results of the measurements are shown in FIG. 47. Note that the junction area of the TMR element was $100\times100$ μm$^2$.

As seen from FIG. 47, in the Al layer case, no magneto-resistive coefficient can be obtained from the TMR element until the surface roughness Ra is less than 0.5 nm. The reason is considered to be that in the magnetic tunnel junction layer which provides the TMR element, the insulative layer is ruptured between the pair of magnetic layers which are thus put into contact with each other, resulting in an electric short-circuit. It will be known from the measurement results that in this case, the surface roughness of the Al layer is limited to about 0.3 nm and the magneto-resistive coefficient from the TMR element is smaller than those which would be when other elements are used.

FIG. 47 also shows that when the Al$_2$O$_3$ layer is used, the surface roughness Ra can be extremely small as compared with those with the Cu and Pt layers and the magneto-resistive coefficient is correspondingly high.

Thus, it will be understood that the use of the alumina (Al$_2$O$_3$) layer as the metal oxide layer for the nonmagnetic nonconductive layer 25 is very effective for a higher magneto-resistive coefficient of the TMR element 27 formed right above the metal oxide layer.

Figure 48:
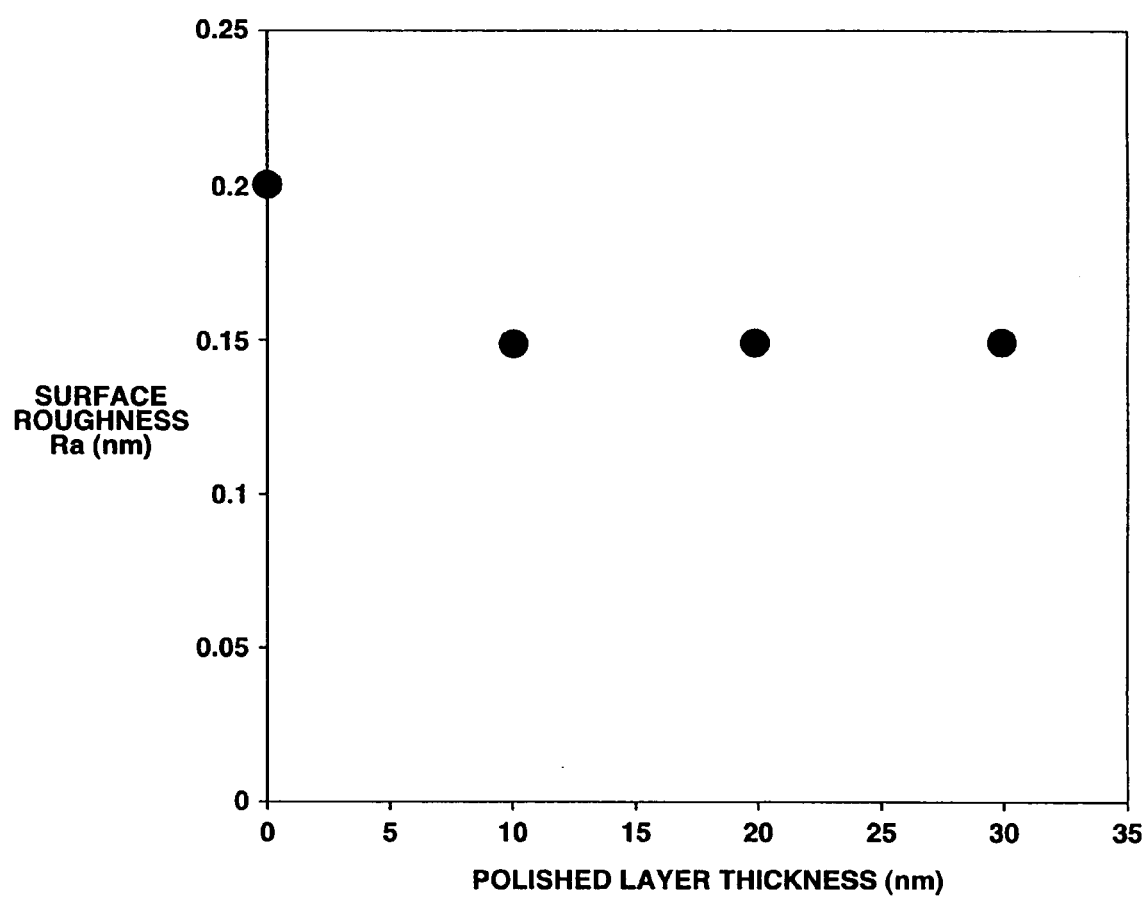
FIG. 48 shows a relation between polished layer thickness and surface roughness Ra.

Also, the relation between the polished layer thickness and surface roughness Ra, observed when the alumina (Al$_2$O$_3$) layer was used as the metal oxide layer for the nonmagnetic nonconductive layer 25. The measurement results are shown in FIG. 48. In this experiment, the abrasive grains (GRANZOX3700 by Fujimi Incorporated) were used for the chemical and mechanical polishing (CMP).

As will be known from FIG. 48, when the metal oxide layer is polished to more than 10 nm by the CMP method, the surface roughness Ra will be saturated. Namely, the thickness of the metal oxide layer should be more than 10 nm. On the other hand, the thickness upper limit of the metal oxide layer depends upon the reading gap length of the shielded TMR head actually produced and it is about a half of the reading gap length, more specifically, 80 nm at maximum.

Also, the relations between the thickness of each of the layers of Al$_2$O$_3$, Al, Cu and Pt, polished after being formed, and the surface roughness Ra of each layer were measured. The measurement results are shown in FIG. 49.

Figure 49:
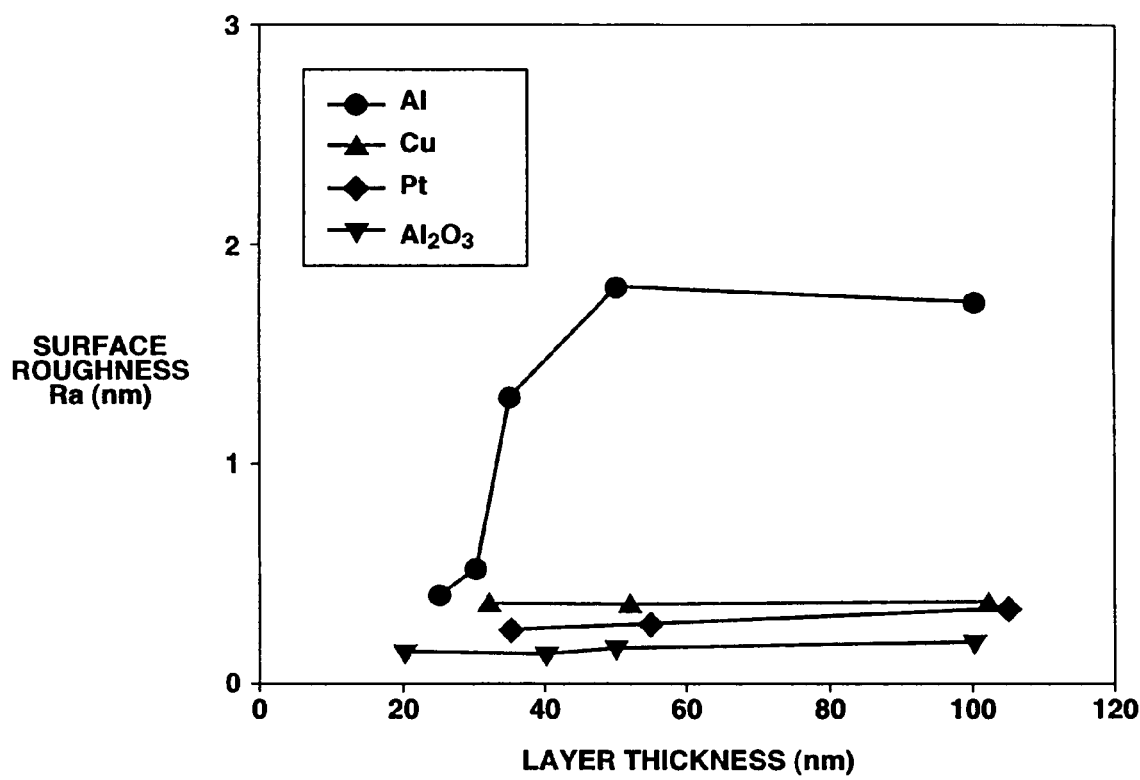
FIG. 49 shows a relation between layer thickness and surface roughness Ra.

As will be apparent from FIG. 49, in the Al layer case, as the layer thickness is increased, the surface roughness Ra increases rapidly. It will be known that the surface roughness Ra will be worse as compared with those of the layers of other metal elements.

On the other hand, as will seen from FIG. 49, the Al$_2$O$_3$ layer shows a stable surface roughness Ra which does not depend upon the layer thickness. Namely, the alumina layer has an extremely good surface roughness Ra. The surface roughness Ra of the alumina layer can be made very small as compared with those of the other metal oxide layers of Cu, Pt and the like. Even when the alumina layer is about 80 nm in thickness, which is the upper limit of the aforementioned metal oxide layers, it can have a good surface roughness Ra.

Note that the width of the metal oxide layer should preferably fall within a range from about a half of that of the aforementioned shielding layer 24 to about three times larger than the track width Tw$_1$ when viewed from the medium-opposite face 4a of the TMR head 21.

Figure 50:
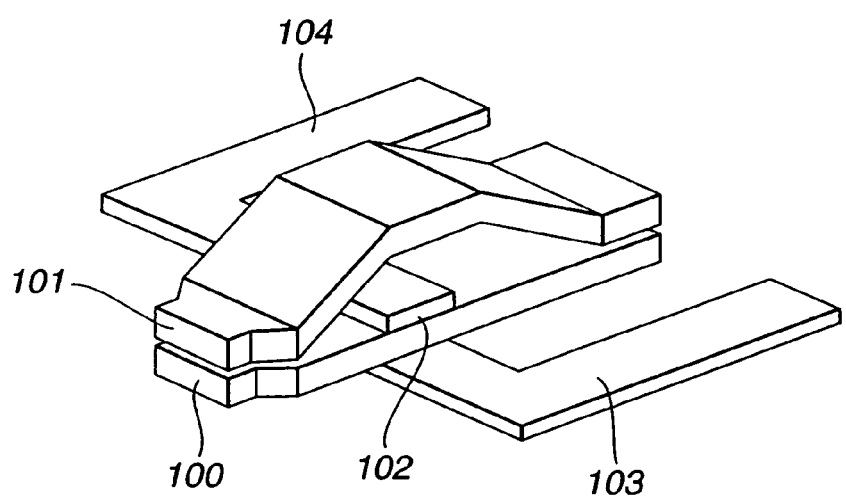
FIG. 50 is a schematic perspective view of an example of the yoke type TMR head.

In the foregoing, the present invention has been described concerning a so-called shielded TMR head, as the TMR head, having the TMR element sandwiched with the gap layers between the pair of magnetic shielding layers. As shown in FIG. 50, however, the TMR head according to the present invention may be embodied as a so-called yoke type TMR head in which a TMR element 102 is sandwiched with gap layers between a pair of magnetic shielding layers 100 and 101 to lead the magnetic flux from a magnetic recording medium to the TMR element 102 in order to attain a high weatherability and lower noise. That is, the TMR element 102 is not exposed outside. In this embodiment as well, external connection terminals 103 and 104 are connected to the pair of magnetic shielding layers 100 and 101, respectively, and these magnetic shielding layers 100 and 101 work as electrodes to enable a narrow gap between the pair of magnetic shielding layers 100 and 101 and the TMR element 102.

Note that in the foregoing, the present invention has been described concerning the composite type thin-film magnetic head including the TMR head 21 as the read head and the inductive type thin-film head 22 as the write head but the present invention is of course applicable to a magnetic head constructed from only the TMR head.

Also note that the TMR head according to the present invention is not limited to a one which is to be installed in a hard disc drive but it is applicable widely to the field of magnetic recording. The TMR head according to the present invention can also be used in a magnetic disc drive using a flexible disc as a recording medium, a magnetic tape drive using a magnetic tape as a recording medium, etc. for example.

What is claimed is:

1. A method of producing a magnetic tunnel effect type magnetic head, the method comprising steps of:

forming a first soft magnetic conductive layer on a substrate to provide a lower shielding layer;

forming an oxide layer and a first nonmagnetic conductive layer, on the first soft magnetic conductive layer, to provide a lower gap layer;

forming, on the first nonmagnetic conductive layer, a magnetic tunnel junction layer to provide a magnetic tunnel junction element;

forming, on the magnetic tunnel junction layer, a second nonmagnetic conductive layer to provide an upper gap layer; and forming, on the second nonmagnetic conductive layer, a second soft magnetic conductive layer to provide an upper shielding layer, wherein the oxide layer of the lower gap layer is disposed beneath at least the magnetic tunnel junction layer, and wherein the oxide layer has a surface roughness of less than 0.2 nm in center line average height Ra.

* * * * *